United States Patent
Dewulf

(10) Patent No.: US 8,600,735 B2
(45) Date of Patent: Dec. 3, 2013

(54) DIRECTED VARIATION OF IDENTIFIED PRODUCT FEATURES USING LANGUAGE ANALYSIS OF A KNOWLEDGE BASE

(76) Inventor: Simon Dewulf, Maarschalk Plumerlaan (BE)

(*) Notice: Subject to any disclaimer, the term of this patent is extended or adjusted under 35 U.S.C. 154(b) by 1437 days.

(21) Appl. No.: 11/848,768

(22) Filed: Aug. 31, 2007

(65) Prior Publication Data
US 2008/0091671 A1    Apr. 17, 2008

Related U.S. Application Data

(60) Provisional application No. 60/841,634, filed on Aug. 31, 2006.

(51) Int. Cl.
*G06F 17/27* (2006.01)
*G06F 17/20* (2006.01)
*G06F 17/21* (2006.01)

(52) U.S. Cl.
USPC ...................... 704/9; 704/1; 704/10

(58) Field of Classification Search
None
See application file for complete search history.

(56) References Cited

U.S. PATENT DOCUMENTS 5,122,951 A * 6/1992 Kamiya ................ 704/9
7,689,523 B2 * 3/2010 Sato ................ 706/45
2001/0034629 A1 * 10/2001 Cronin ................ 705/7
2005/0114282 A1 * 5/2005 Todhunter ................ 706/50
2006/0167931 A1 * 7/2006 Bobick et al. ................ 707/102

OTHER PUBLICATIONS

Yoon et al. "A systematic approach for identifying technology opportunities: keyword-based morphology analysis", Technological Forecasting and Social Change, 72, 2005, pp. 145-160.*
Paramind Website (www.paramind.net) including web pages paramind.net/ "paraprog", "paraidea", "paraphrs", "pmresrch", and "lesson5" .html, all accessed Aug. 30, 2004.*

* cited by examiner

*Primary Examiner* — Jesse Pullias
(74) *Attorney, Agent, or Firm* — Barnes & Thornburg LLP

(57) ABSTRACT

Computer based methods, systems and interfaces for analyzing machine readable data repositories having text documents, and for generation of new product specifications, for evaluation of these specifications and for the generation of new product designs and products therefrom. Language analysis of the data repository results in a list of properties of a product being properties to be varied linked to a list of functions of the product. The property statements can be first parts of speech such as adjectives, or adjectival phrases or adjectival statements being definitions of properties of a product. The function statements can be second parts of speech such as verbs, or verb-like phrases or statements being definitions of functions. The list of property statements, optionally with related first parts of speech, linked to the respective function statements optionally with related second parts of speech are stored as a database of indexed property statements/function statement tuples.

25 Claims, 43 Drawing Sheets

Excerpt of a process according to the present invention applied to sugar

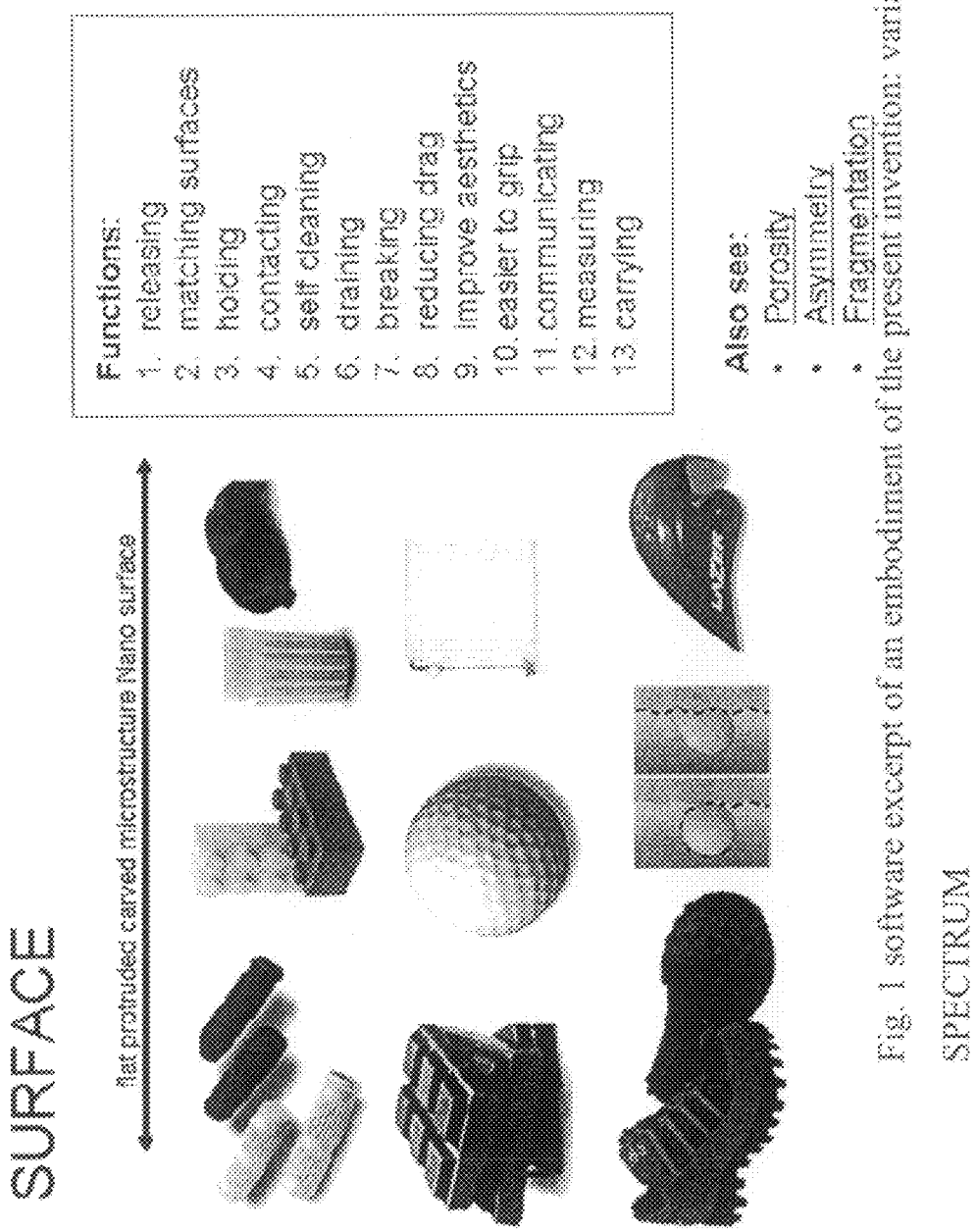
Fig. 1 software excerpt of an embodiment of the present invention: variation chart: SURFACE SPECTRUM

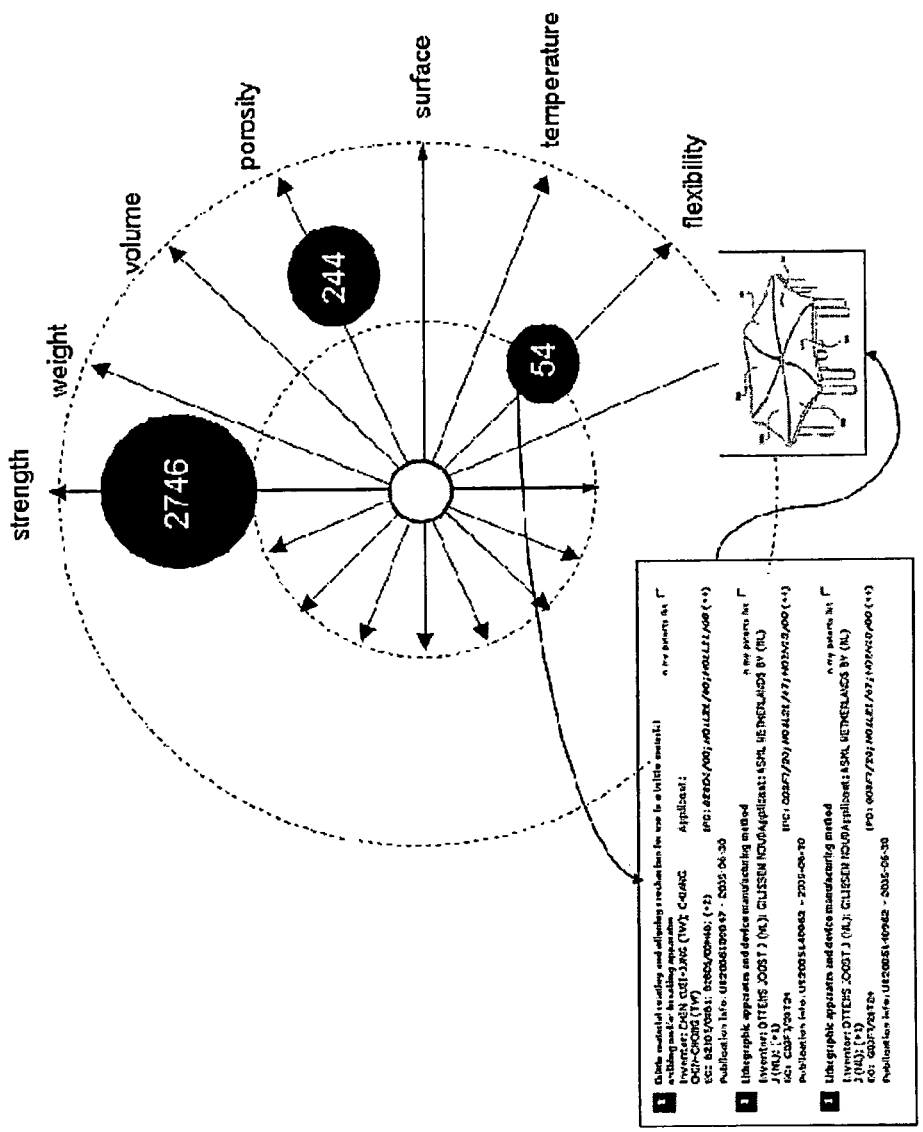
Fig 2A : Manually search 'property product' and indicate, place total number on each property variation in proportional circle

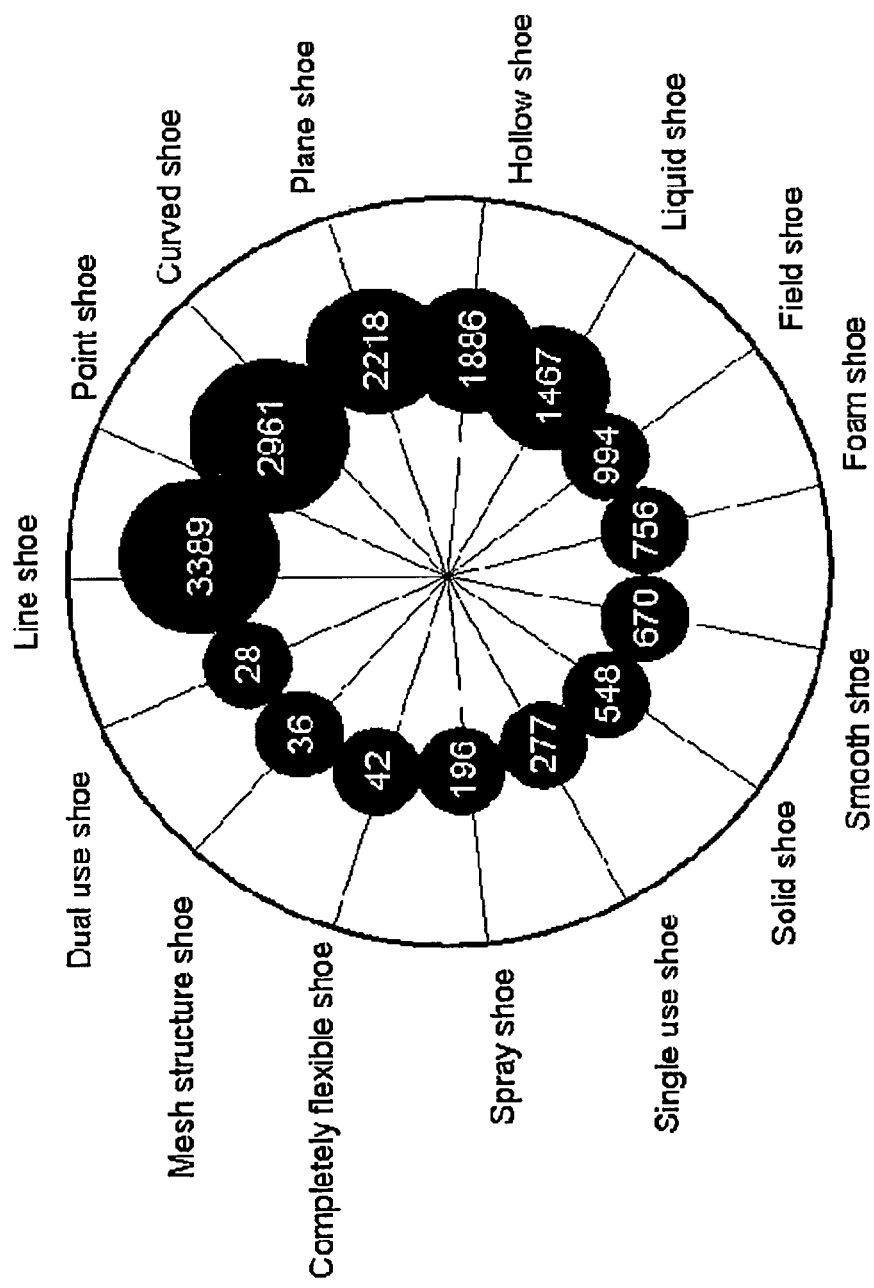
Fig. 2b: Spectrum Chart Excerpt generated automatically in accordance with the present invention for the product shoe Fig. 3 A) a process going from property to function, B) from function to property

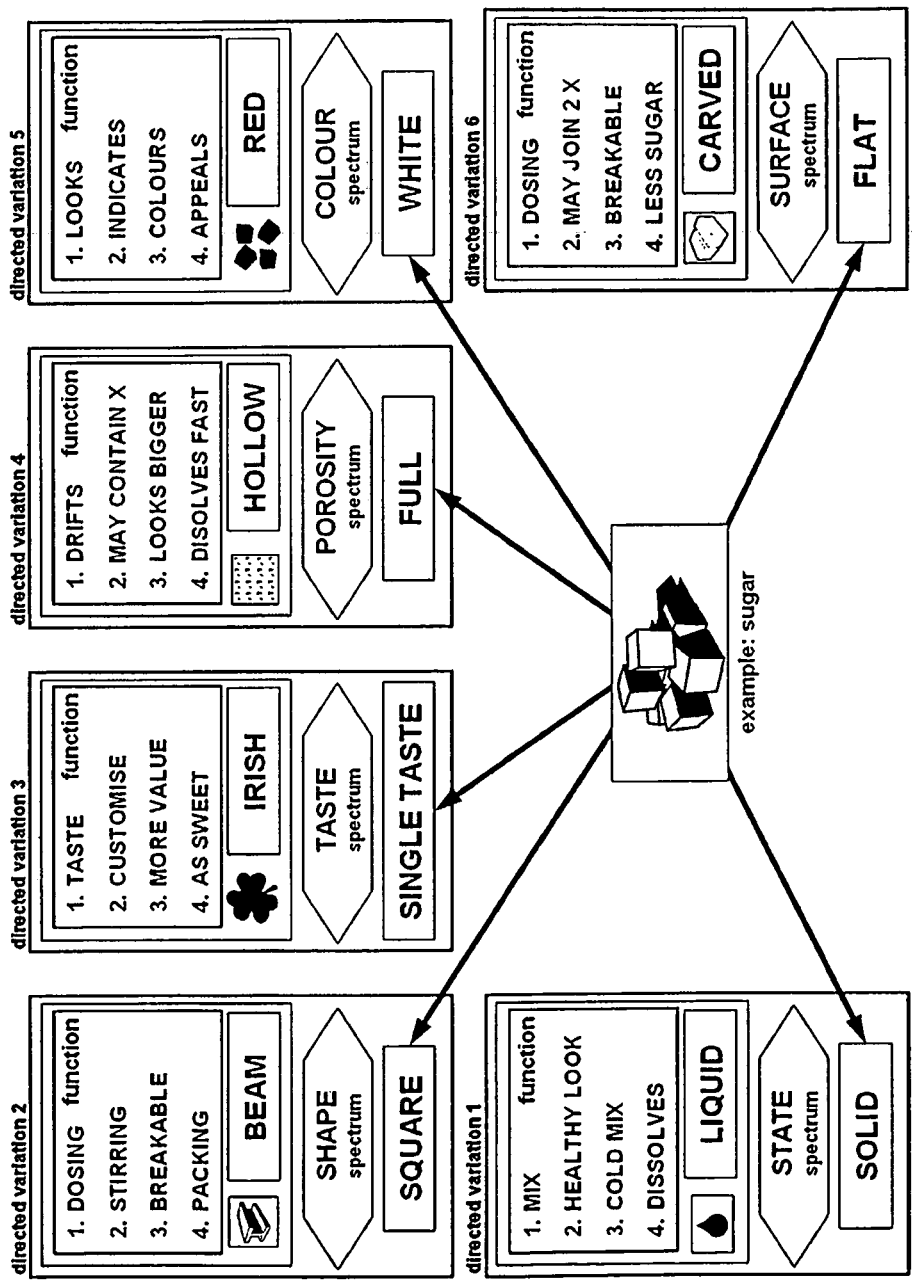
Fig. 4 Excerpt of a process according to the present invention applied to sugar

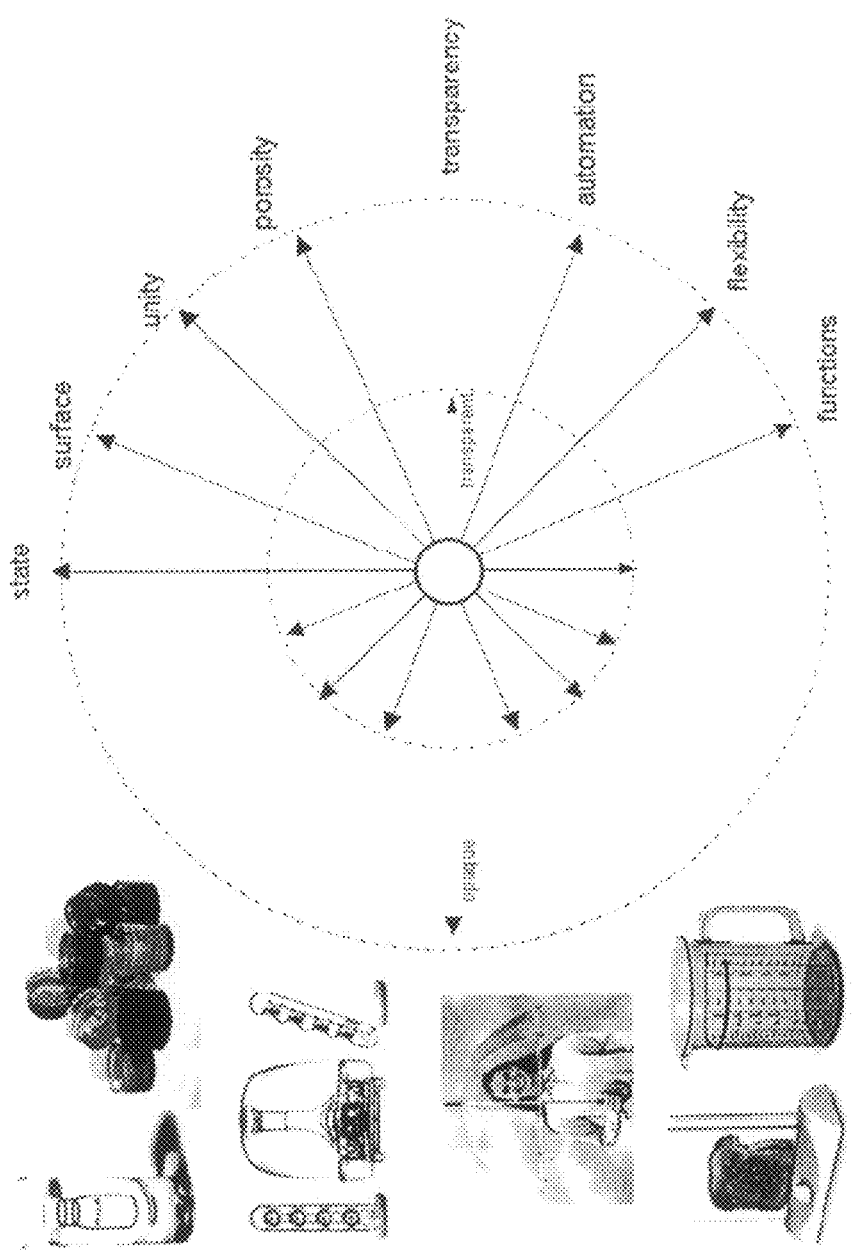
Fig. 5 a Variation Chart with spectrum examples TRANSPARENCY in accordance with an embodiment of the present invention.

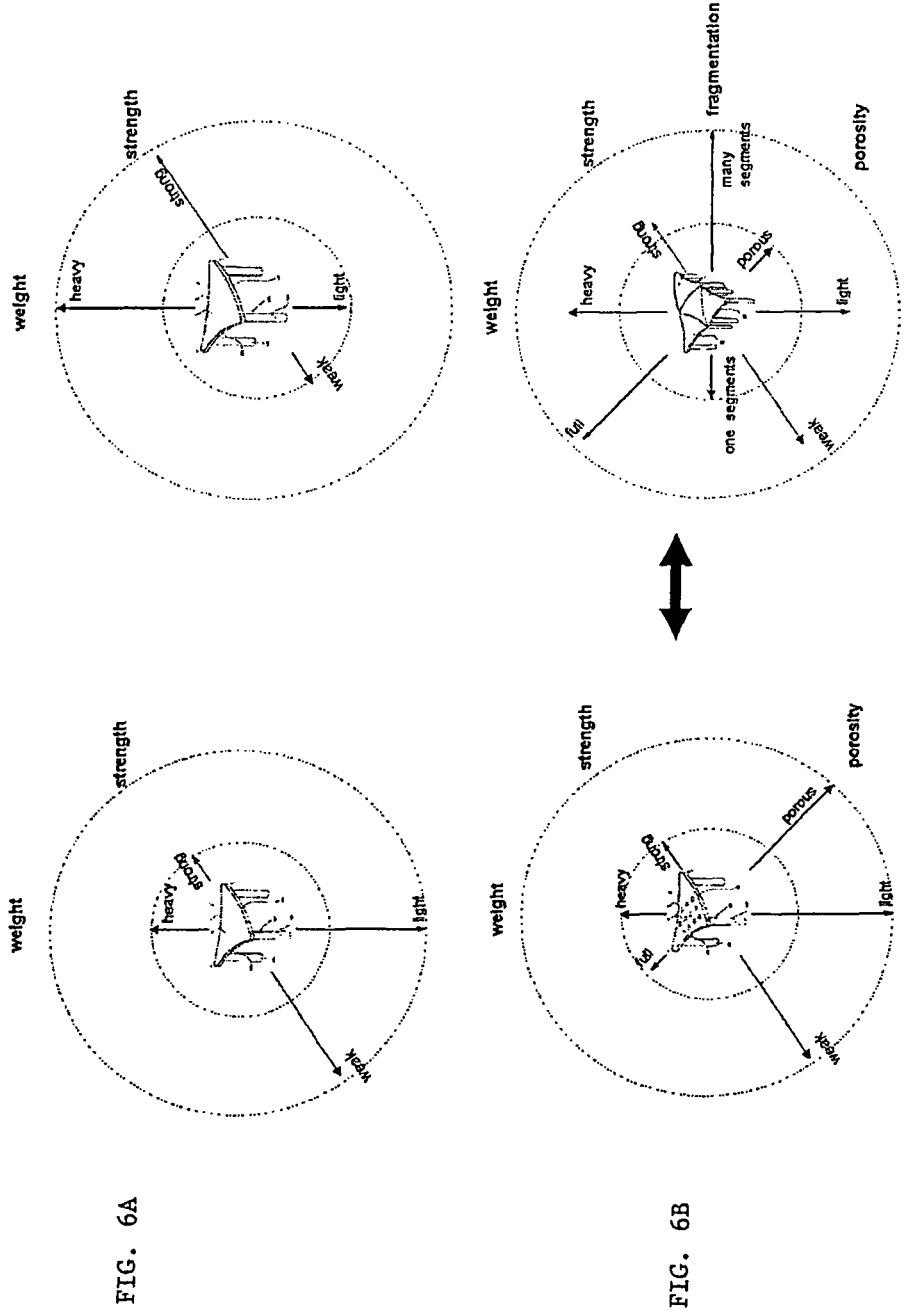
Fig. 6. A: Table conflict expressing strong but heavy OR light but weak.
B: Conflict resolution directions property spectrum porosity (left) and fragmentation (right)

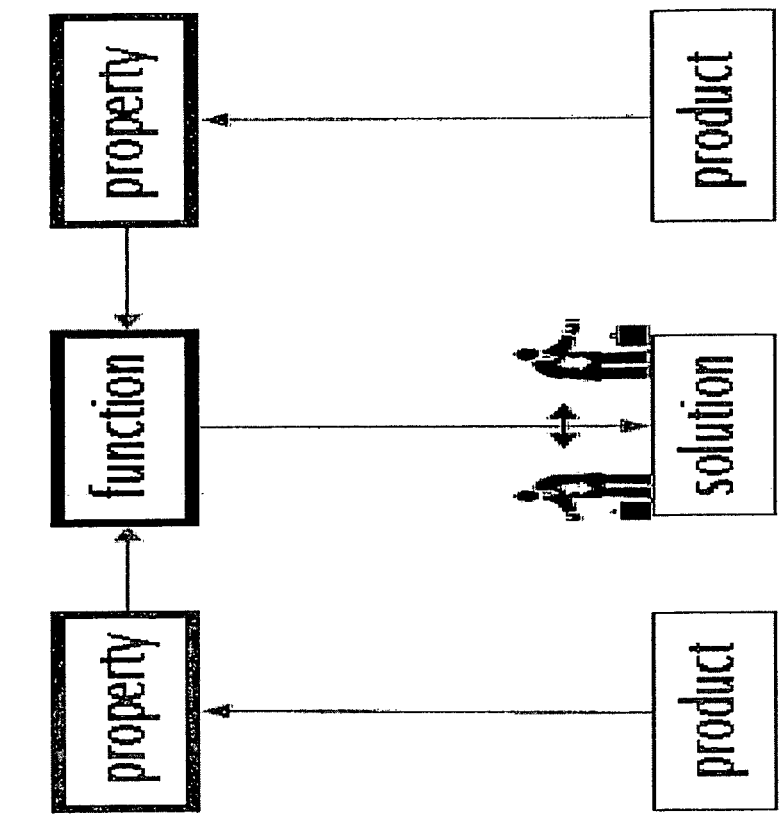
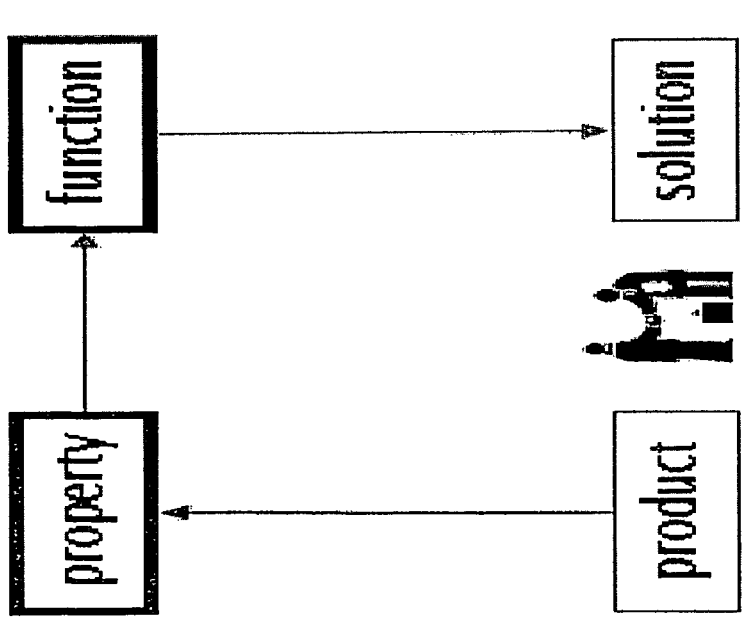
Fig 7 Property Function Diagrams

| 1. Properties of the bigger system and environment in the past | 2. Properties of the bigger system and environment | 3. Properties of the bigger system and environment in the future |
|---|---|---|
| *was part of that was or had* | *is part of that is or has* | *will be part of that will be or will have* |
| 4. Properties before the product or process | 5. Properties of the product or process | 6. Properties after the product or process |
| *was or had* | *is or has* | *will be or will have* |
| 7. Properties of the components and sub-components in the past | 8. Properties of the components and sub-components | 9. Properties of the components and sub-components in the future |
| *consisted of that was or had* | *consists of that is or has* | *will consist of that will be or will have* |

Fig. 8: property space-time diagram (9 windows)

| 1. Functions of the bigger system and environment in the past | 2. Functions of the bigger system and environment | 3. Functions of the bigger system and environment in the future |
|---|---|---|
| *was part of that did or underwent* | *is part of that does or undergoes* | *will be part of that will do or will undergo* |
| 4. Functions before the product or process | 5. Functions of the product or process | 6. Functions after the product or process |
| *did or underwent* | *does or undergoes* | *will do or will undergo* |
| 7. Functions of the components and sub-components in the past | 8. Functions of the components and sub-components | 9. Functions of the components and sub-components in the future |
| *consisted of that did or underwent* | *consists of that does or undergoes* | *will consist of that will do or will undergo* |

Fig 9 Function space-time diagram (9 windows)

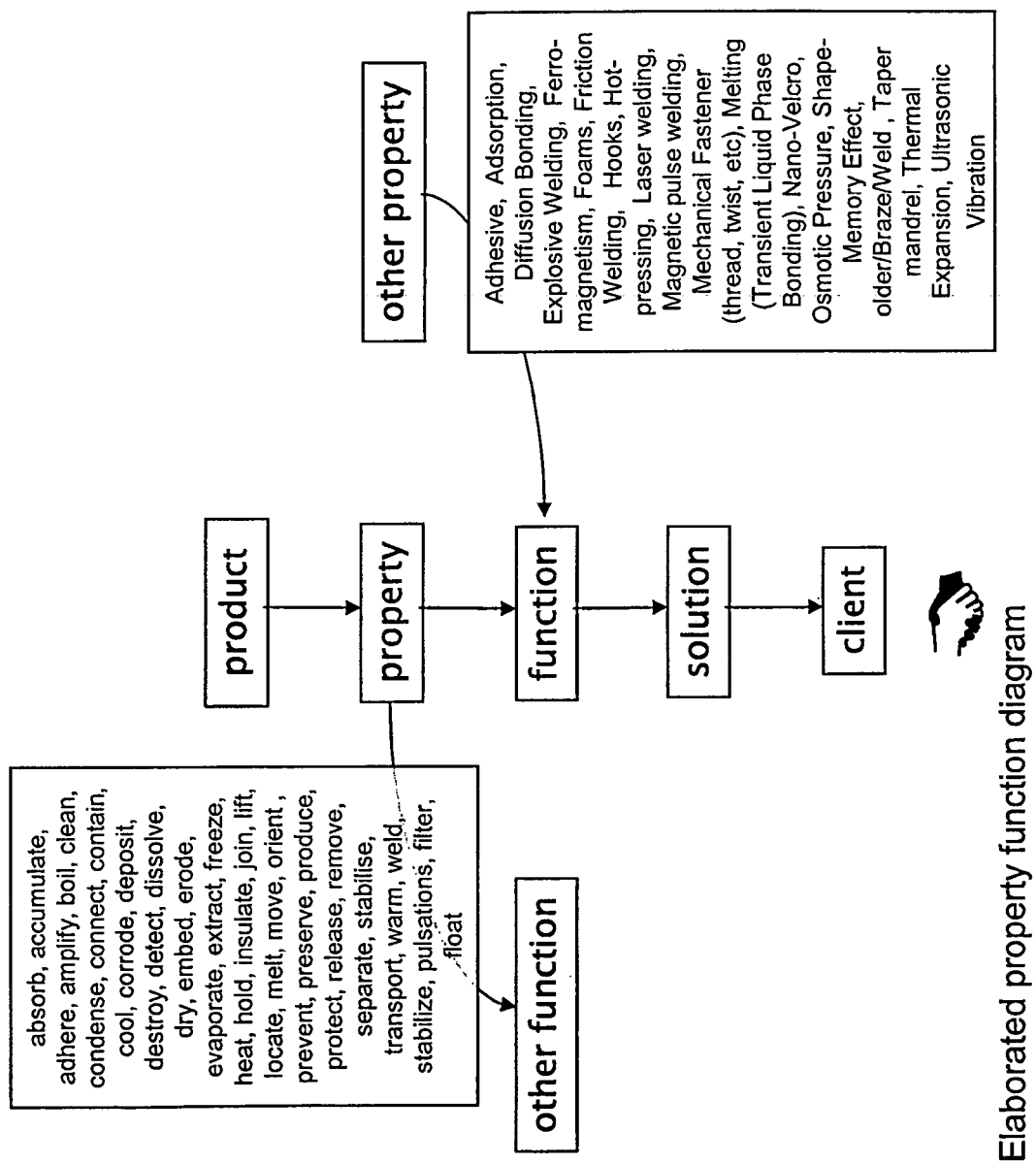
Fig 10 Elaborated property function diagram

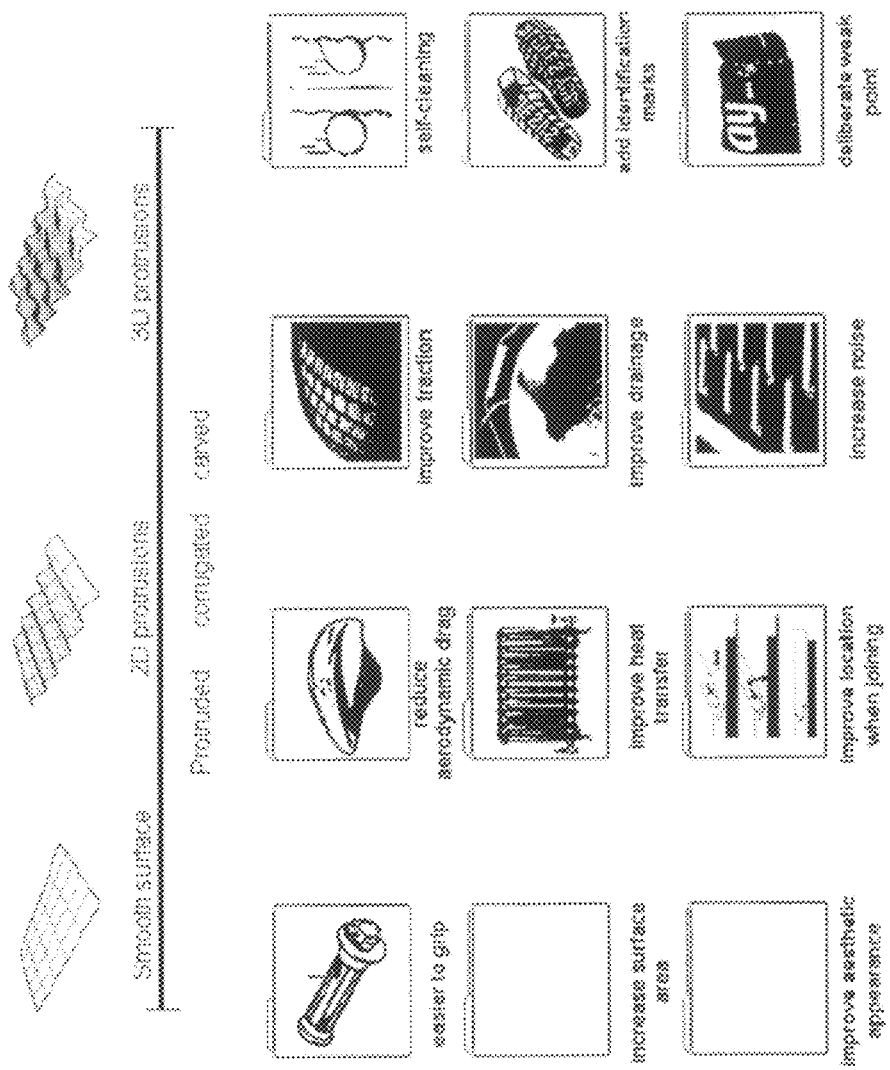

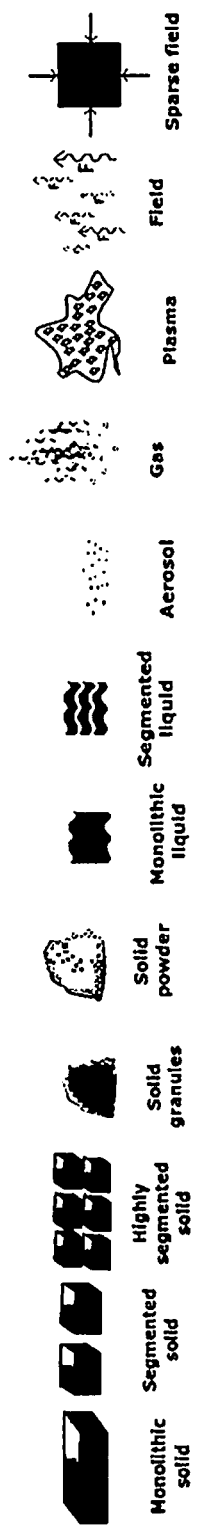
Fig. 12 SOLID → segmented → powder → LIQUID → segmented → liquid → aerosol → GAS → plasma → FIELD (1)
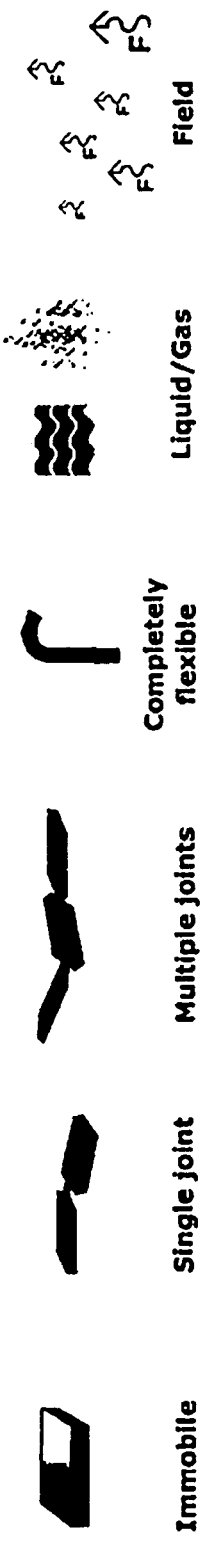
Fig. 13 SOLID → single joint → multiple joint → flexible → LIQUID → GAS → FIELD (2)

|  | DISOLVING (in liquid) | FILTERING (liquid) | STRENGTH/ WEIGHT | SEPARATION |
|---|---|---|---|---|
| MALE | SUGAR POWDER | POWDER FILTER | TABLE IN TWO PARTS | SEVERAL BINS |
| FEMALE | SUGAR CUBE | SPONGE FILTER | HOLLOW POREUS TABLE | MULTIPLE COMPARTMENT BIN |

Fig 14. Example of symmetrical variation porosity versus fragmentation

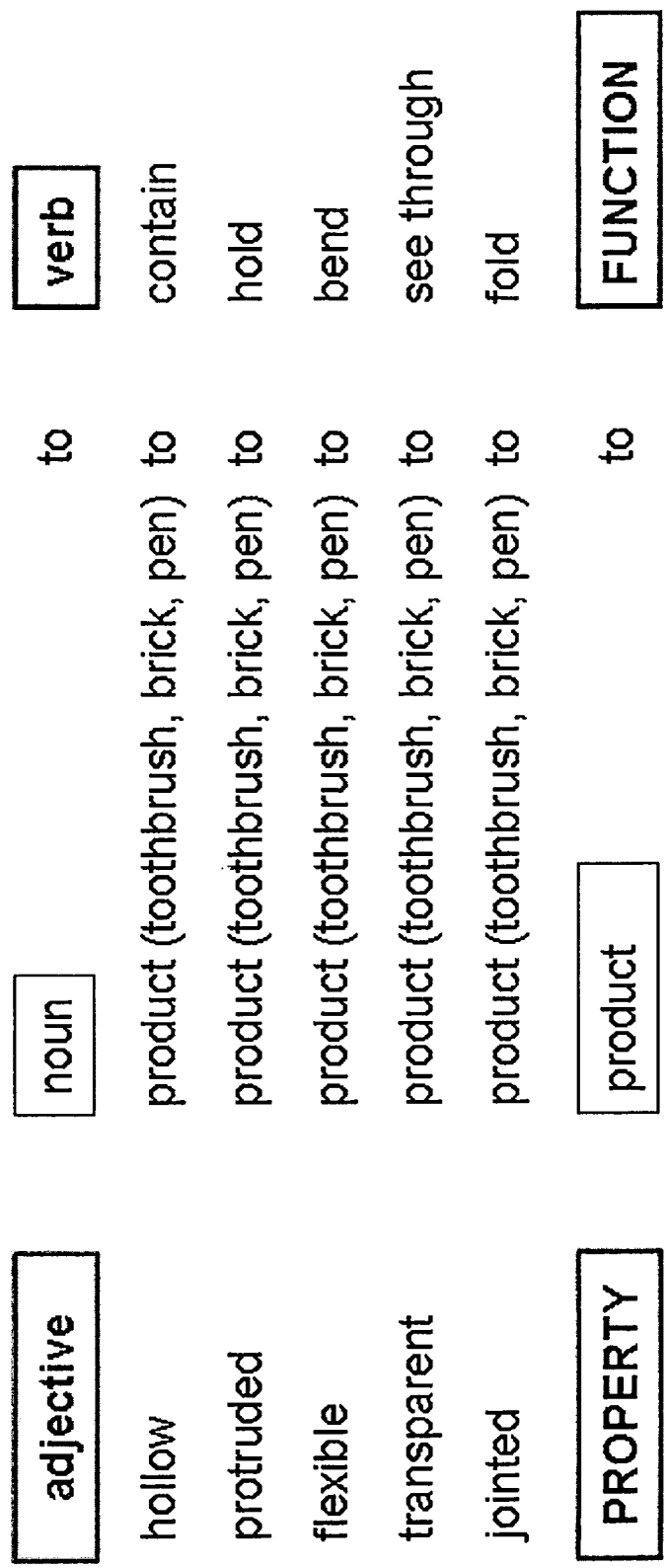
Fig 15 idea generator

Fig. 16. A Screenshot; the Directed Variation® Idea Generator

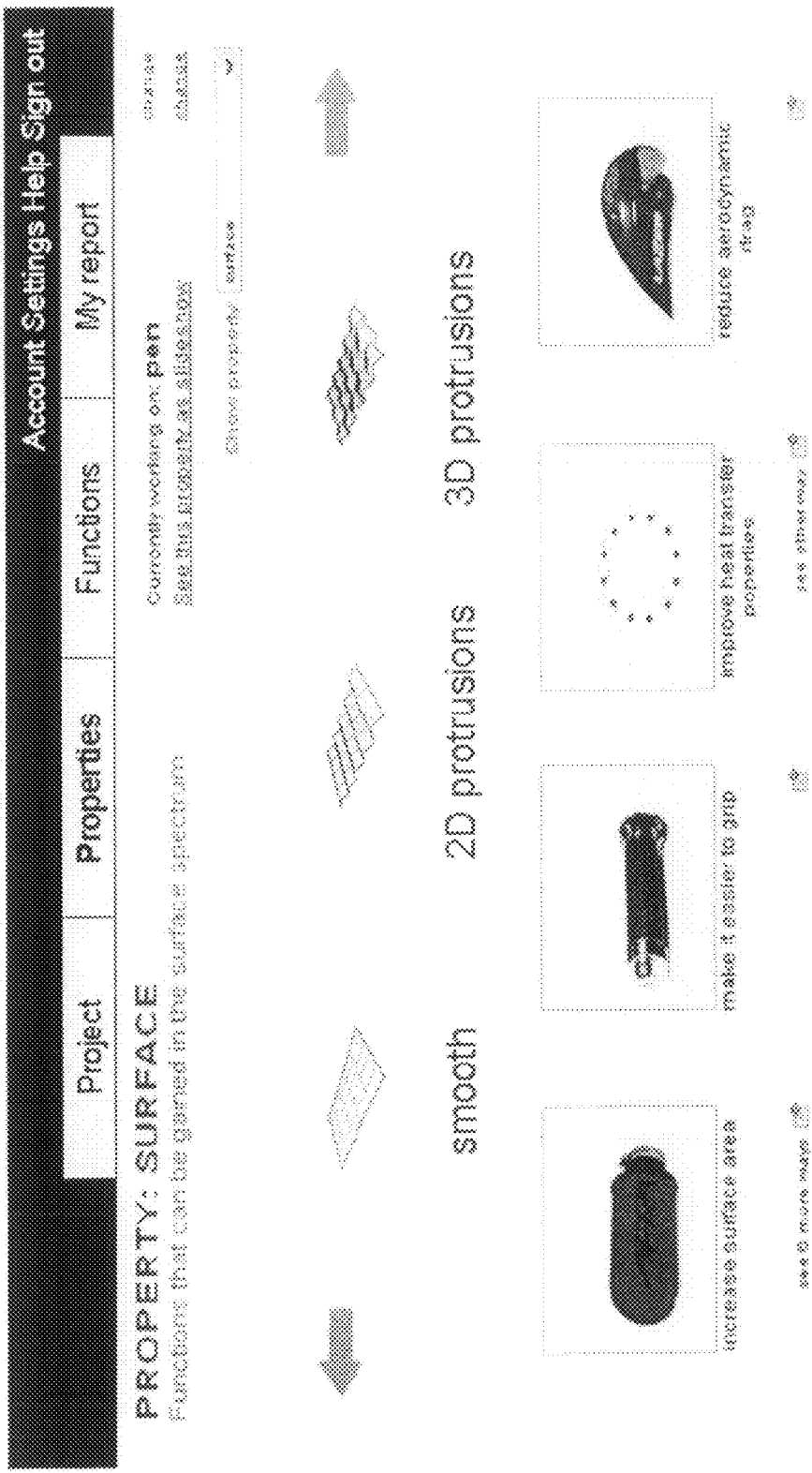
Fig. 17. screenshot directed variation of a property POROSITY

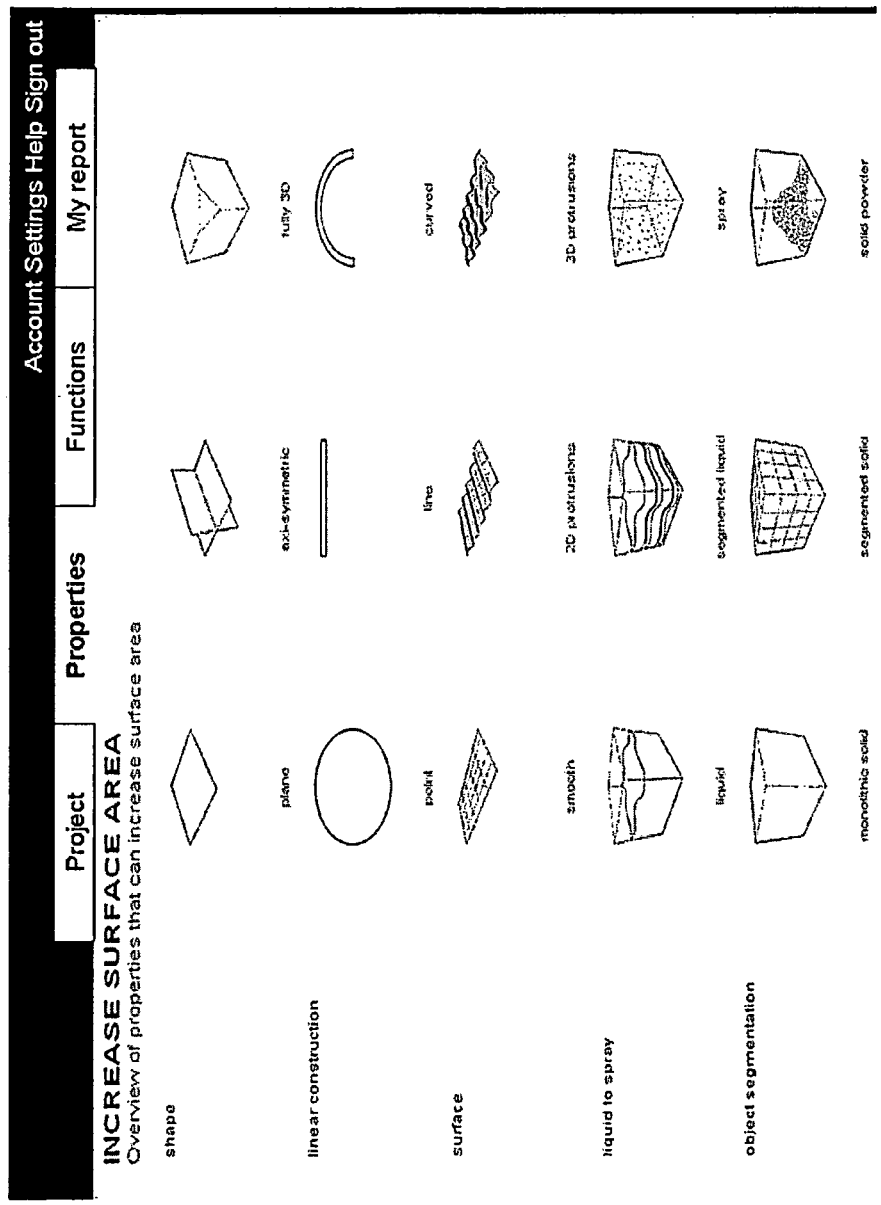
Fig 18. ways to increase surface area

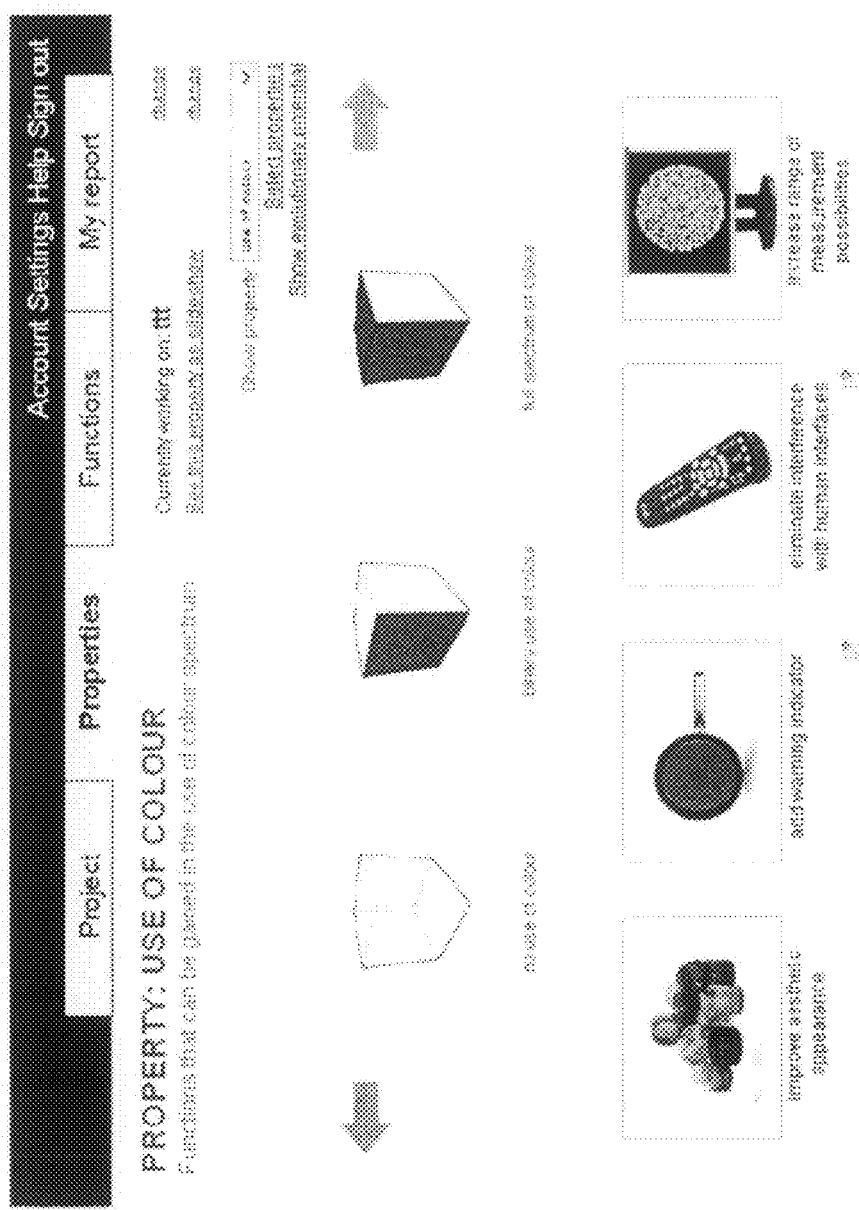
Fig 19. screenshot of property color

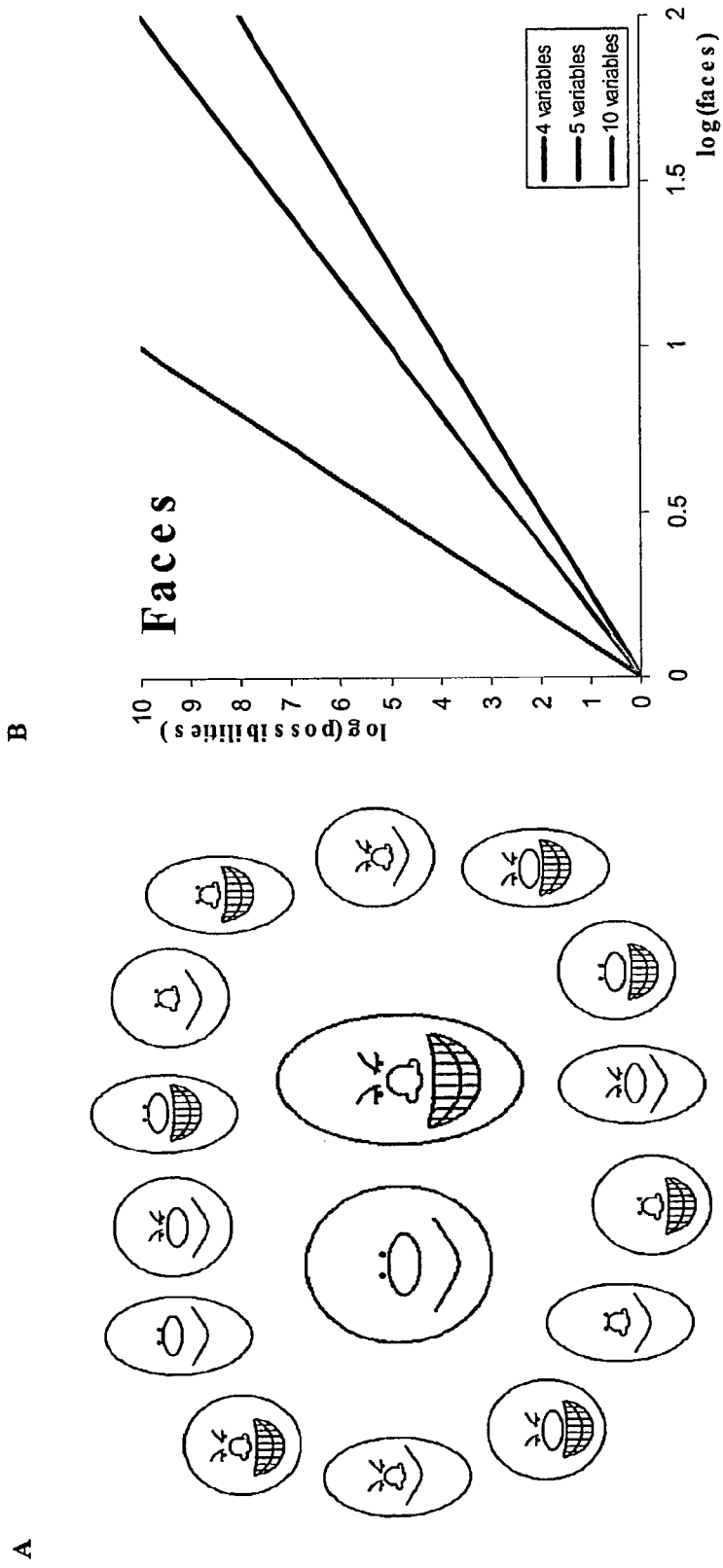
Fig 20. A. recombining 2 faces with 4 variables results in 16 possibilities. B shows that ten variables with each ten variations can bring 1 billion different systems.

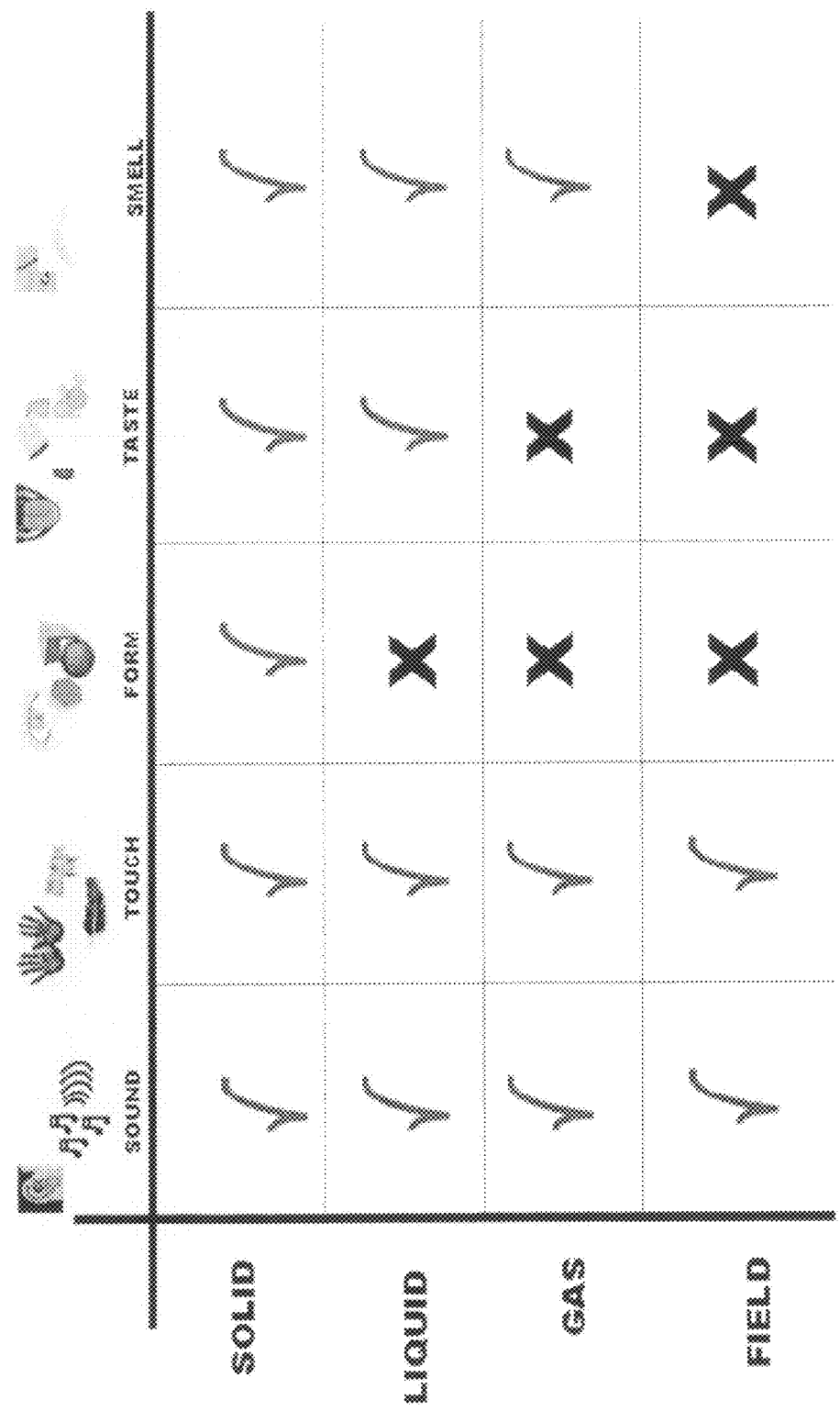
Fig. 21. Degrees of expression deteriorate in increasing state spectrum

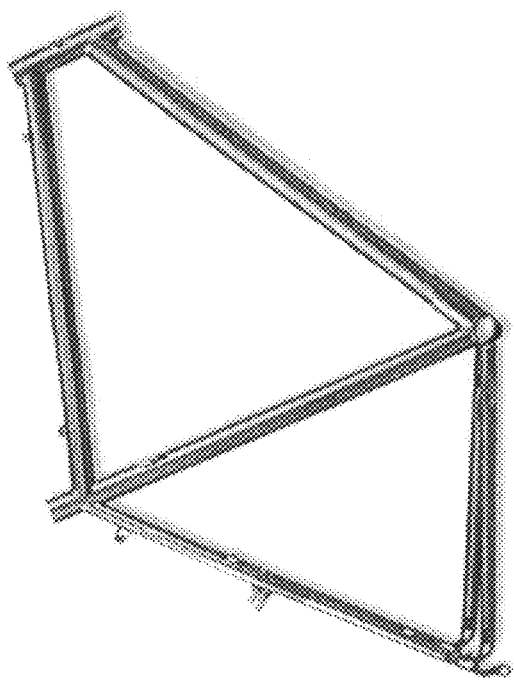

Fig 22. One variation combination of a bicycle frame

| spectrum | | property | |
|---|---|---|---|
| porosity | full | hollow | porous |
| surface | smooth | carved | 3D carved |
| flexibility | immobile | jointed | flexible |
| color | unicolor | bicolor | multicolor |
| bar shape | point | linear | 3D shape |
| state | solid | fluid | field |
| unity | whole | parted | fragmented |
| transp.cy | opaque | translucent | transparent |
| senses | one sense | bisense | multisens |
| symmetry | symmetric | asymmetric | 3D asym |

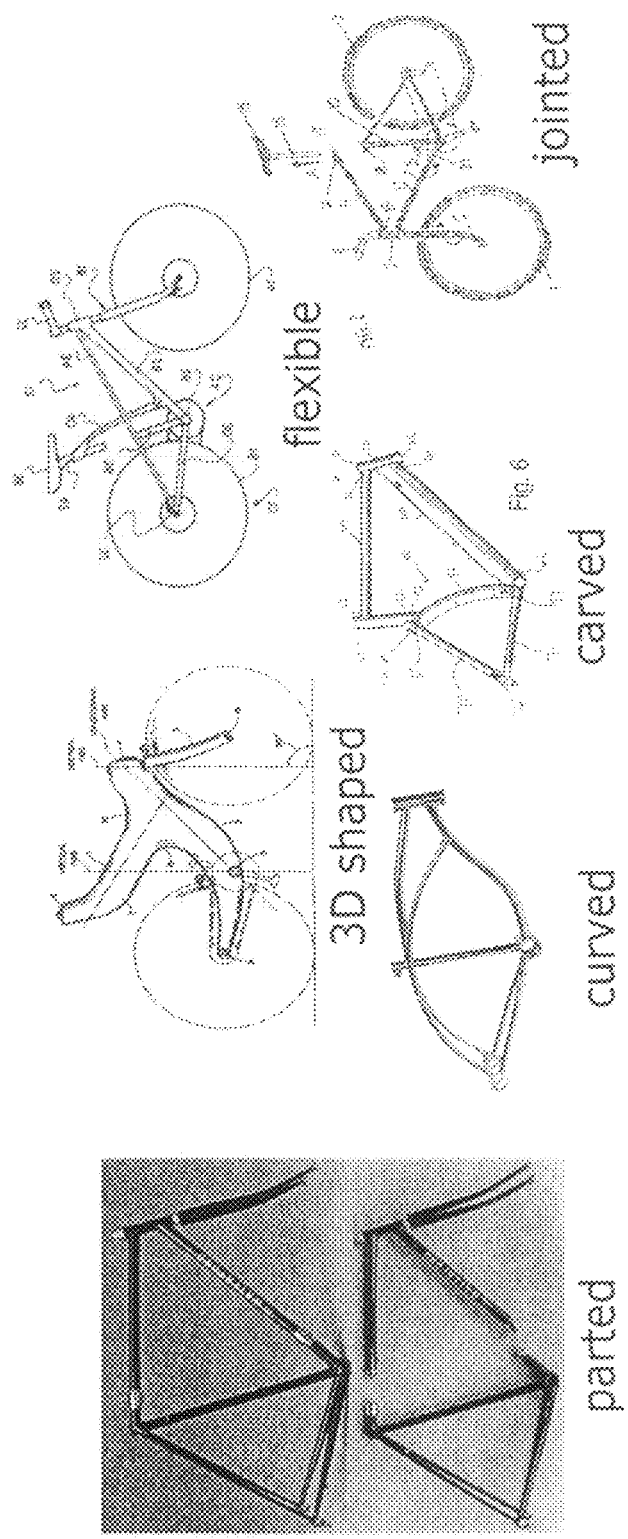
Fig. 23 Patent DB and Web hits on adjectives + bicycle frame

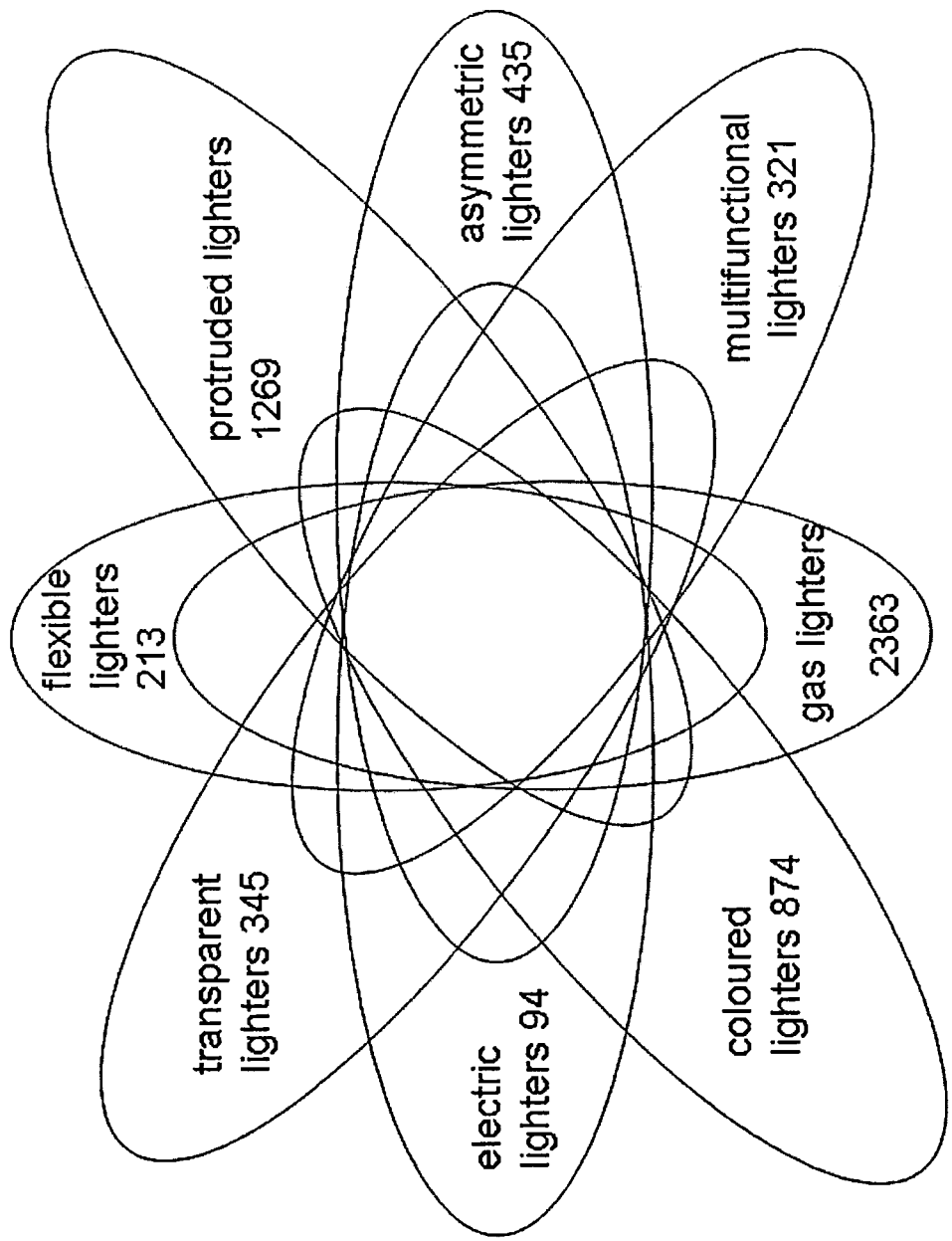
Fig. 24 Dummy patent DB and Web hits on adjectives + lighter

Fig. 25 Final Selected Variations

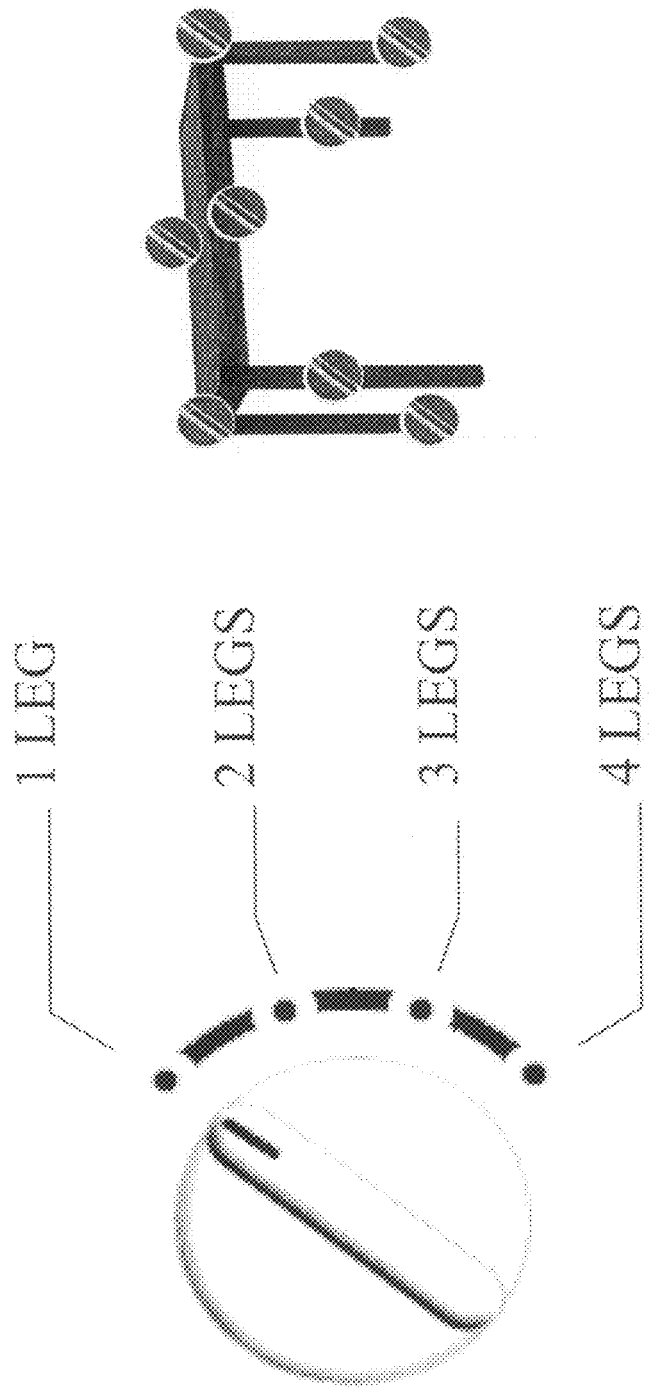
Fig. 26 Analogy variables (number of legs) with button to turn

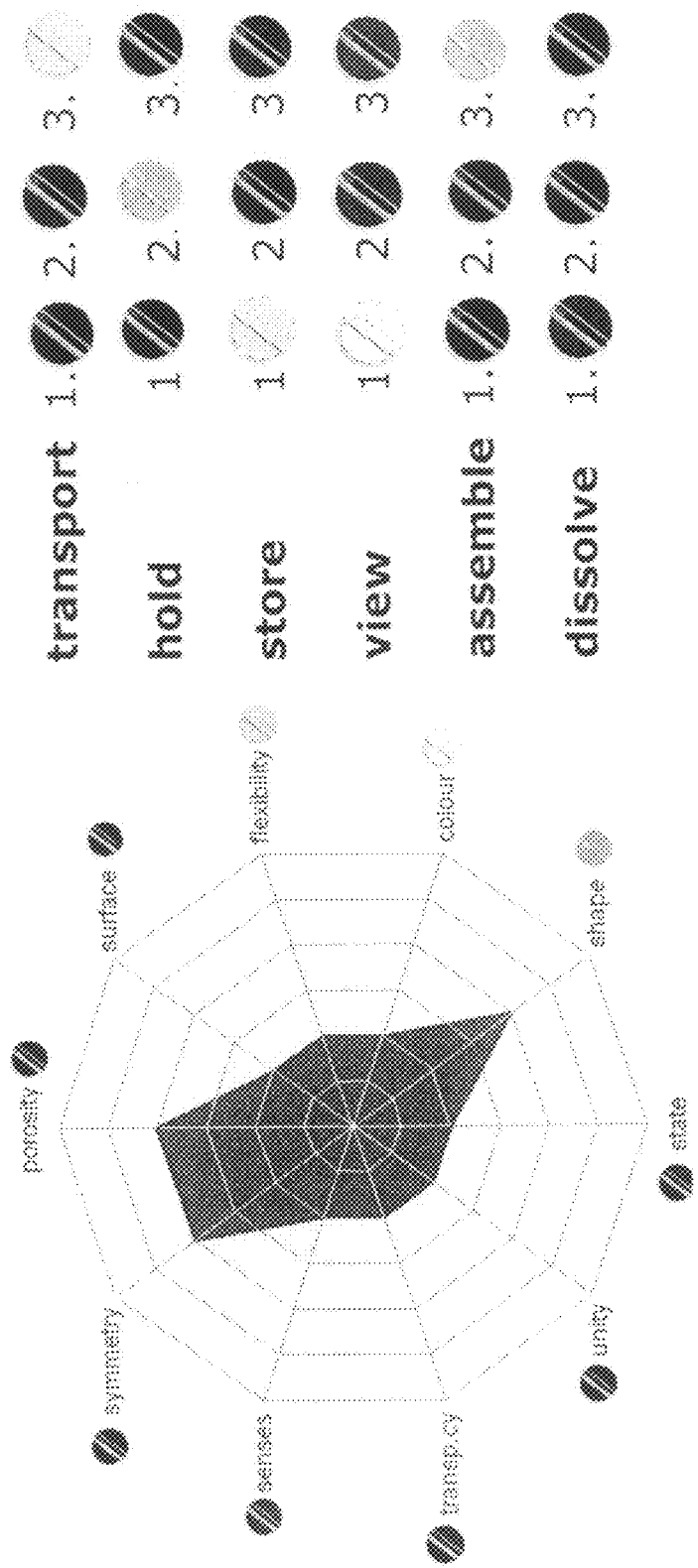
Fig. 28 Functions in/on property plot

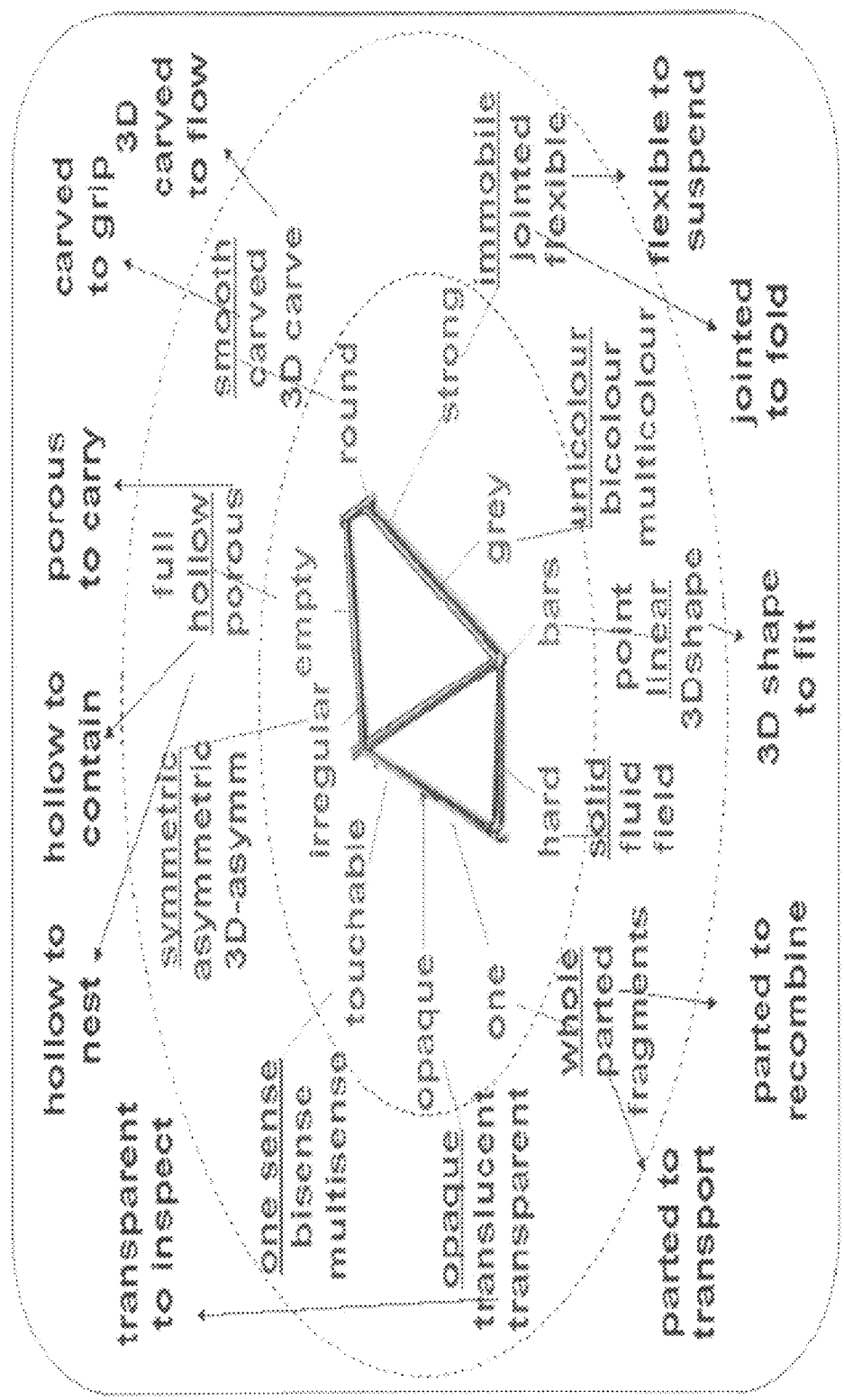
Fig. 29 Property Function Mapping

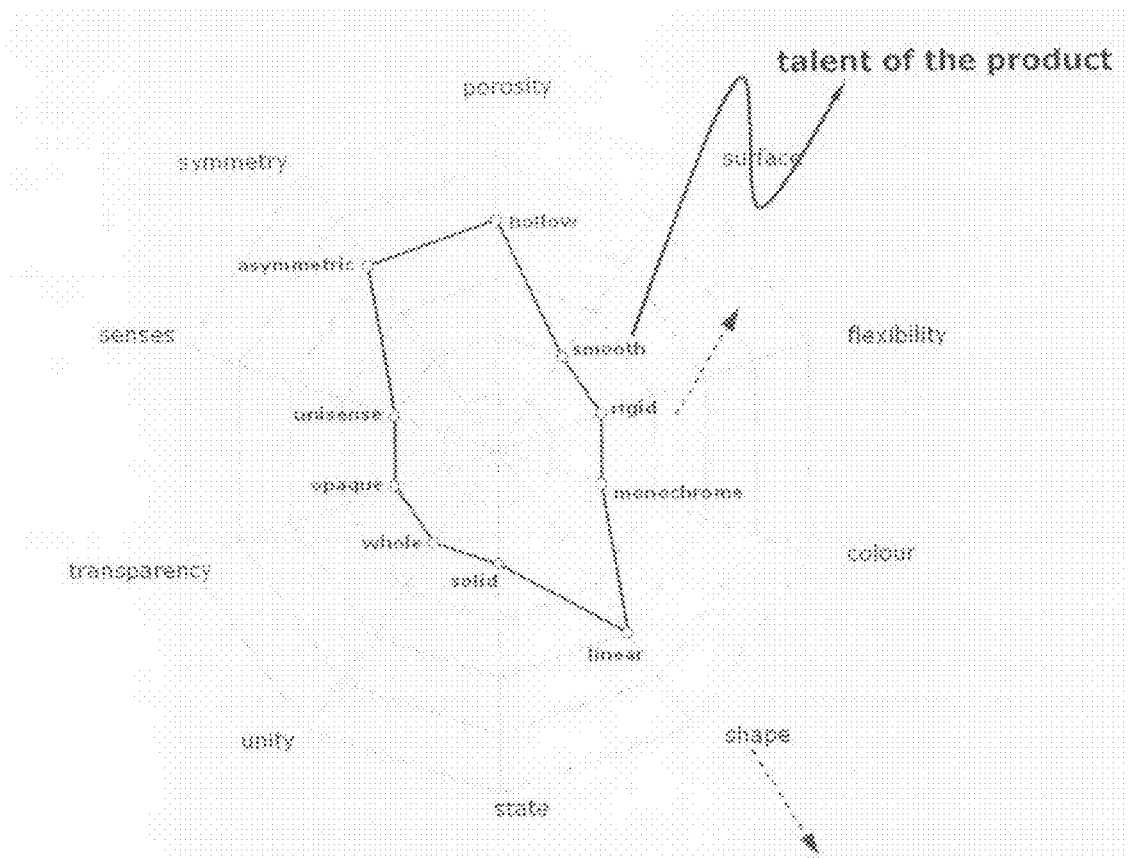
Fig. 37 Property Radar Plot
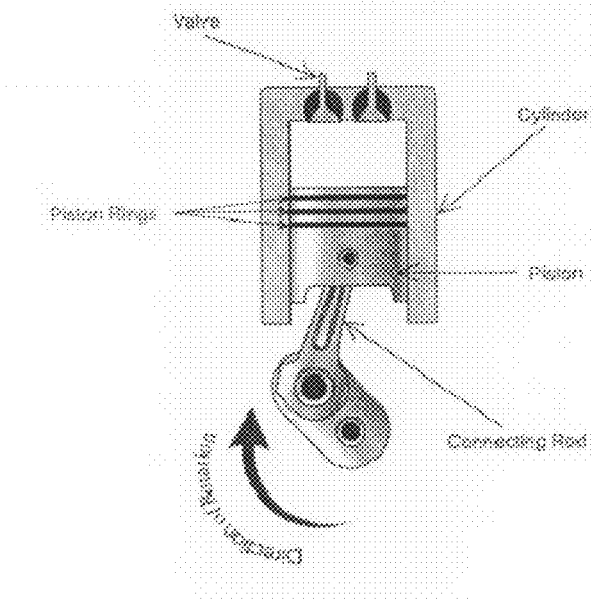
Fig. 38a

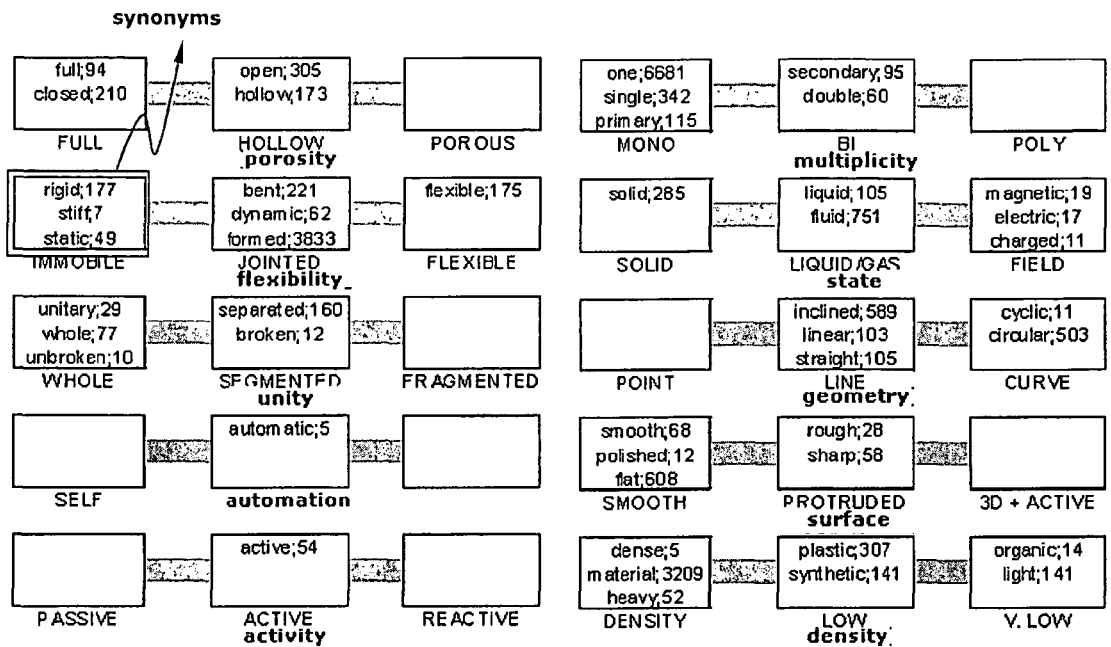
Fig. 38b Adjectives filling the property spectra of 10 properties
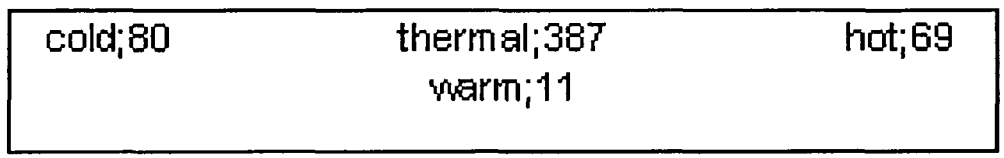
Fig. 39 Adjectives filling the variation spectra of 4 extra properties

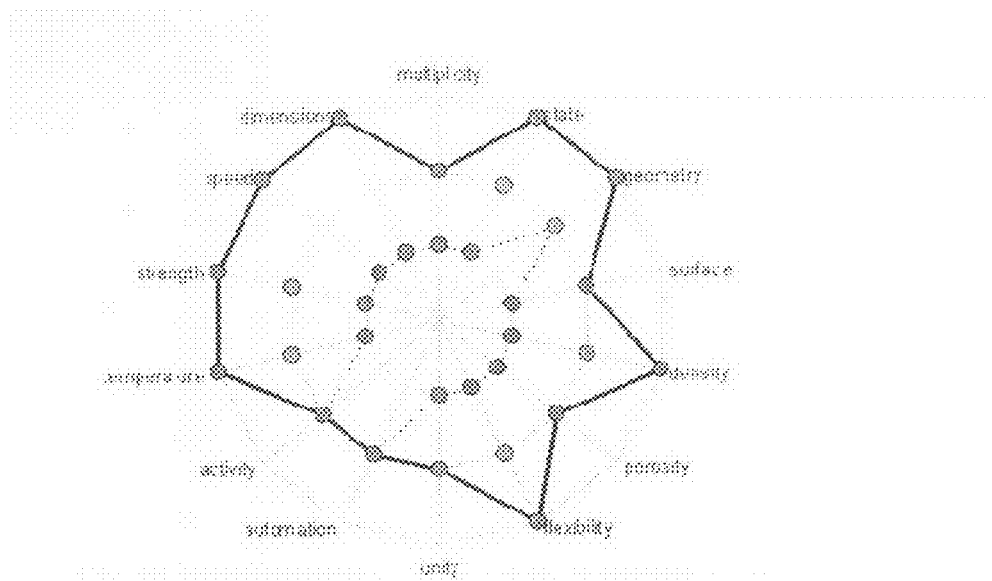
Fig 40A. Property spectrum Piston Ring
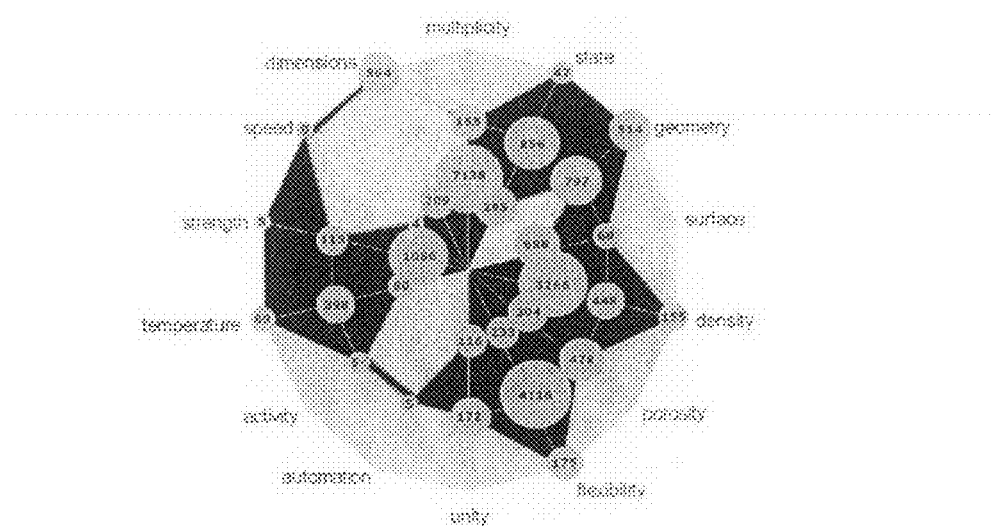
Fig 40B Indicating the property occurrence

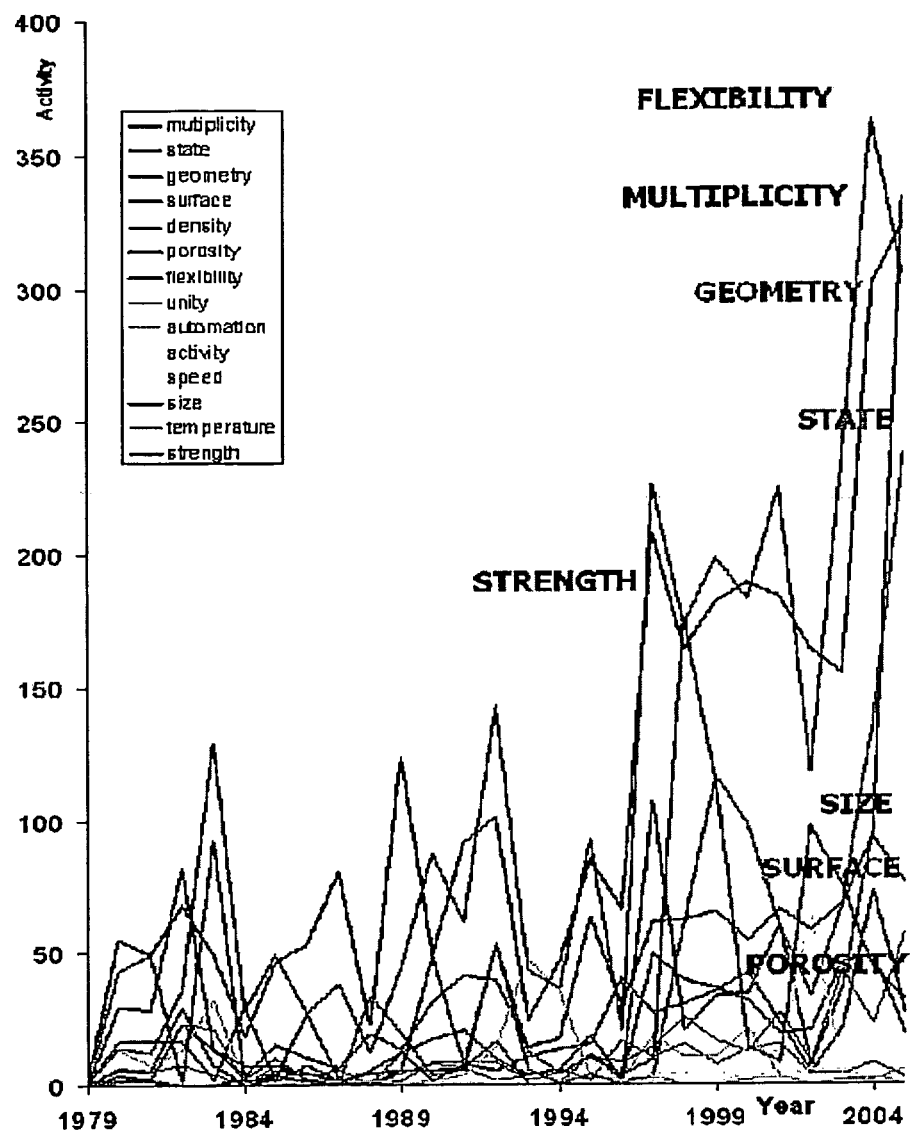
Fig 41 Property variations over time

| | | | | | | | | | | | | |
|---|---|---|---|---|---|---|---|---|---|---|---|---|
| alloy | 6640 | S | 769 | Al | 337 | Ti | 102 | Tm | 42 | PPS | 17 |
| steel | 4729 | P | 794 | bronze | 326 | tin | 98 | Sm | 42 | mercury | 16 |
| chromium | 3837 | I | 793 | Y | 314 | calcium | 90 | Yb | 42 | Polymer | 16 |
| O | 3535 | Ni | 737 | manganese | 288 | Fr | 86 | Eu | 42 | Hg | 16 |
| iron | 2438 | cobalt | 661 | boron | 277 | Sn | 73 | Sc | 38 | Ar | 14 |
| aluminum | 2380 | PTFE | 594 | vanadium | 262 | silver | 72 | Tungsten | 36 | Pt | 12 |
| carbon | 2381 | W | 583 | O | 254 | Be | 63 | Pd | 34 | PAN | 12 |
| composite | 2328 | Mo | 570 | rubber | 224 | Er | 59 | Sb | 33 | Pm | 10 |
| resin | 2031 | U | 536 | K | 210 | Zn | 55 | Cs | 32 | Ag | 10 |
| B | 1464 | Mn | 492 | ceramics | 181 | Am | 54 | PFA | 31 | Argon | 10 |
| nickel | 1316 | H | 471 | Ce | 164 | Gd | 51 | Ra | 29 | Os | 9 |
| silicon | 1222 | Fe | 461 | hydrogen | 163 | Pr | 50 | Hf | 29 | Cl | 9 |
| F | 1131 | Cu | 452 | Mg | 156 | vapour | 50 | PS | 28 | Selenium | 9 |
| Cr | 1083 | lead | 451 | Nb | 154 | Ho | 48 | Cd | 24 | Polyester | 8 |
| plastic | 1070 | V | 412 | PEEK | 152 | Dy | 48 | beryllium | 22 | Ru | 8 |
| ceramic | 1023 | N | 405 | magnesium | 141 | Nd | 47 | Rh | 18 | Silicone | 8 |
| chrome | 898 | Co | 393 | zinc | 134 | Au | 46 | Nitrogen | 18 | Pf | 8 |
| titanium | 897 | polyetrafla | 362 | Zr | 117 | Tb | 46 | Re | 17 | | |
| copper | 848 | CrNi | 361 | diamond | 103 | Ta | 46 | Ge | 17 | | |

Fig 42. material occurrence in piston ring patent pool

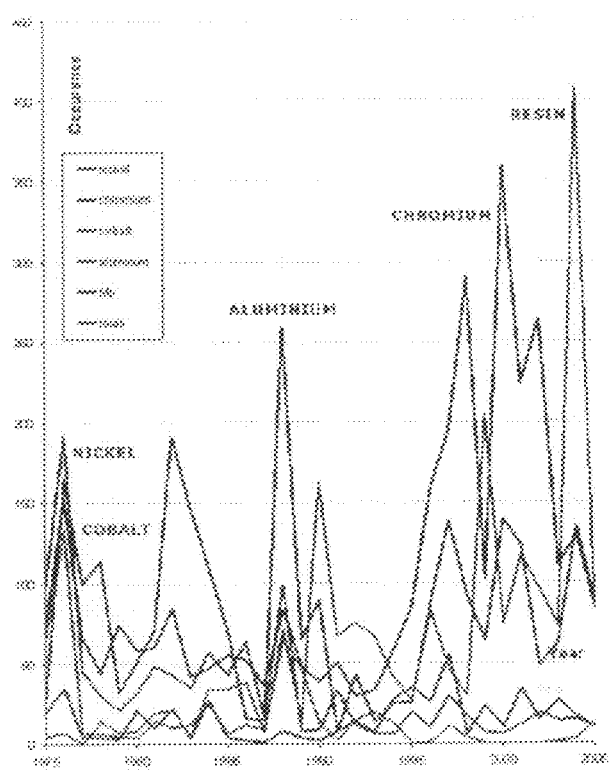

Fig 43. Material Occurrence over time (selection)

A

| produce | 969 | absorb | 94 | destroy | 28 |
|---|---|---|---|---|---|
| separate | 884 | connect | 85 | freeze | 23 |
| move | 789 | join | 80 | extract | 16 |
| contain | 303 | locate | 70 | condense | 10 |
| remove | 280 | adhere | 65 | preserve | 9 |
| hold | 251 | filter | 56 | dissolve | 5 |
| melt | 119 | lift | 53 | amplify | 2 |
| float | 95 | orient | 35 | | |

B

| wear | 7737 | lock | 354 |
|---|---|---|---|
| cast | 2853 | fracture | 352 |
| cut | 2832 | transfer | 350 |
| strip | 2639 | charge | 301 |
| block | 1353 | scuff | 262 |
| exhaust | 1220 | crack | 224 |
| expand | 547 | carry | 160 |
| rotate | 356 | fill | 156 |

Fig 44. Functional verbs distilled out of patent pool with number of appearance

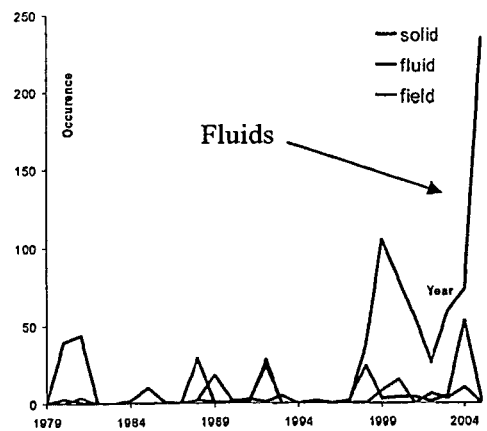

Fig 45. State Variation over Time

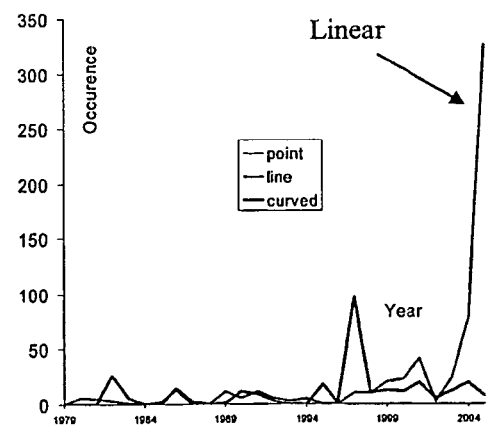

Fig 46. Geometry Variation over Time

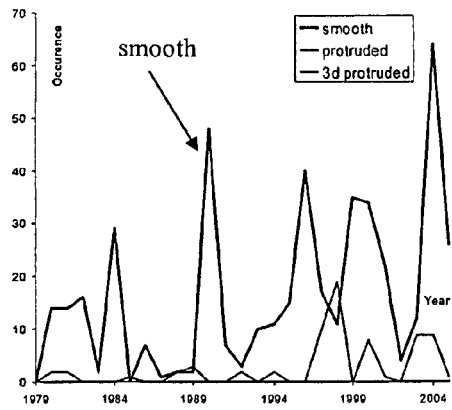
Fig 47 Surface Variation over Time
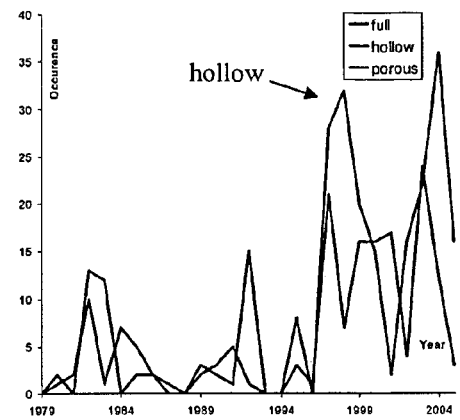
Fig 48 Porosity Variation over Time
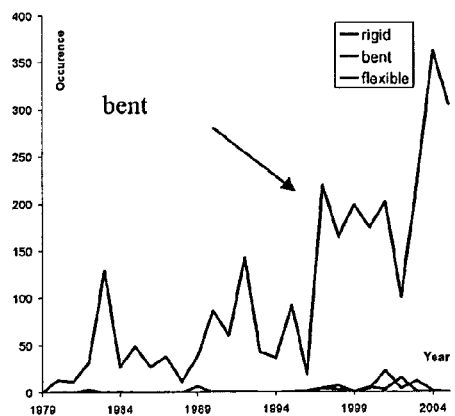
Fig 49 Flexibility Variation over Time
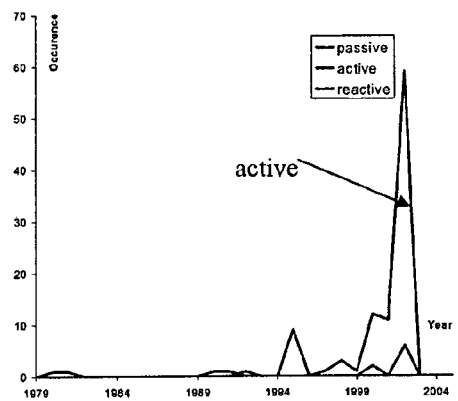
Fig 50 Activity Variation over Time

DIRECTED VARIATION OF IDENTIFIED PRODUCT FEATURES USING LANGUAGE ANALYSIS OF A KNOWLEDGE BASE

RELATED APPLICATION

This application is the non-provisional filing of Provisional U.S. Application No. 60/841,634 filed Aug. 31, 2006.

TECHNICAL FIELD

The present invention relates to Computer Aided Innovation and provides computer based methods, systems and interfaces for analyzing machine readable data repositories such as knowledge databases having text documents, for generation of new product specifications, for evaluation of these specifications and for the generation of new product designs and products therefrom.

TECHNICAL BACKGROUND

U.S. Pat. No. 7,051,022 describes a technique for generating cross-references among categories in a knowledge base to extract a plurality of themes from a corpus of documents. A cross-reference between categories of the category pairs in the knowledge base is generated so as to identify an association between the category pairs.

SUMMARY OF THE INVENTION

The present invention provides a computer based interface tool and method that is designed to allow more of the good (performance, integration, ergonomics, design) and less of the bad (complexity, confusion, time) features of a product to be identified in an automatic manner. One of the key factors of the present invention is the integration of innovation tools with language analysis of a machine readable data repository such as a knowledge database with text documents. Any suitable form of analysis can be used, e.g. semantic analysis, grammatical analysis, POS tagging, statistical Natural Language Processing or probing with keywords or a combination of any of these. As is well known, language analysis generally also involves dealing with exceptions as language is not perfectly logical in its structure.

Language analysis of the data repository, e.g. database or databases, results in a distinct number of, e.g. a list of, properties of a product called property statements being properties to be varied linked to a distinct number, e.g. a list of, functions of the product called function statements. The property statements can be first parts of speech such as adjectives, or adjectival phrases or adjectival statements being definitions of properties of a product. The function statements can be second parts of speech such as verbs, or verb-like phrases or statements being definitions of functions. The list of property statements, optionally with the related first parts of speech, linked to the respective function statements optionally with the related second parts of speech is stored, e.g. formed into a new database of indexed property statements/function statement tuples that can be independent of the products themselves. Alternative or additional features can be used to form the indexed database such as materials or production methods which are associated with the property statements or function statements, e.g. manufacturing methods suitable to obtain a specific property. Accordingly, an initial step in accordance with embodiments of the present invention is the language analysis of machine readable data repositories, e.g. databases, to find at least tuples such as property/function tuples linking properties of products and functions of products independently of the products themselves. "At least tuples" means that more features can be analysed than two. For example, more tuples may be analysed or more than two features may be linked together. These tuples or more than tuples are found by searching for linkages between relevant textural or semantic or grammatical features such as adjectives and verbs in the machine readable data repositories, e.g. database(s).

After analysis of the text based data repositories, e.g. databases, the features or tuples or the more than tuples can be ranked in a variety of ways, e.g. based on frequency of occurrence in the documents of the data repository, or based on technology, e.g. the data repository may be restricted to medical applications only etc. Hence the data repository may first be filtered to select a subset of relevant documents, e.g. medical, followed by the searching for the features or at least tuples, e.g. property/function tuples. Alternatively a complete data repository may be searched without a pre-filtering step. The result of the search is a table linking the relevant properties together. One such table can link property, function, production method and material together.

In a second aspect of the present invention the indexed database is used to provide product design changes or "product variations". Product can be any suitable product such as an apparatus, a device, a service, a process, a living organism such as a microorganism or a plant, etc. The starting point is a database of indexed property statements/function statement tuples of products that are preferably independent of the products themselves. The indexed database includes a list of property statements linked to the respective function statements obtained by any means. The links in the indexed database are used to provide product variations, i.e. changes in the design thereof. A limited number of third parts of speech such as nouns or noun-like phrases or statements (being definitions of products called product statements) can be varied by linking the product to a distinct number of first parts of speech such as adjectives, or adjectival phrases or adjectival statements (being definitions of properties to be varied) giving third parts of speech, e.g. new verbs, or verb-like phrases or statements (being definitions of functions of the product). Other parameters can also be used in determining new features of the product.

Example: Process A.

Select a property (adjective) of a product; explore the variations in the property spectrum (via different adjectives linked by function/property tuples); these will indicate new function(s) (verbs), which results in specifications for new products being output automatically.

Example: Process B.

Select a desired function (verb), explore the available property variations (via different adjectives linked by function/property tuples) out of different spectra, that are enabling to this function, and then creating specifications for new products being output automatically.

Methods of directed product variation in accordance with embodiments of the present invention are a simple and effective way to value creation. Process A opens new functions or improved function(s) in the product, process B brings new ways to achieve desired function(s). Importantly the connection between properties and functions are generated independently of the product by analysis of machine readable data repositories, such as databases of which patent databases are only one example.

The present invention also provides a computer based property variation tool that can be applied to any product. As long as the properties of the products are variable, the new functions will emerge from use of the present invention automatically. The present invention also provides a conflict resolution tool (e.g. problem solving) which can be stand-alone or integrated with the property variation tool. Changes required to the properties of a product can often be generated by conflicts, or new products solve old conflicts. When two properties are conflicting, one or more variations of (other) properties can make them coexist or allow a more efficient coexistence.

Properties are linked to science, expressed in adjectives. They are the source of direct analogies. Functions are linked to technologies, expressed in verbs, they are the source of indirect analogies. They are closer to disruptive innovation. Directed product variation provides the structure to group all properties into specific functional categories, which can be searched both ways.

Finally, directed product variation provides a structure to compare products, and extrapolate relevant analogies to any specific domain challenge. Opening properties and functions in space and time provides a checklist of all candidate solution routes. In a further step, for each product (noun) a series of descriptors may be formed to characterize that product. Such descriptors may include any of: properties listed as a string, functions listed as a string, lists of tuples of functions and the related properties as a string or any other list including descriptors of the product that can be derived by analysing text based databases such a manufacturing method or materials used.

A product descriptor may be used to identify other products which have a relevant similarity or analogy with the product under investigation. This is done by comparing the descriptor with descriptors of products obtained by language analysis of data repositories, such as databases with text documents and ranking the comparisons in accordance with a degree of similarity. Products with a high or higher degree of similarity can then be analyzed for product variations e.g. product variations that have occurred over time. Once these product variations are found, they can be applied to the product under investigation to see if similar product variations would be generate new and useful products.

BRIEF DESCRIPTION OF THE DRAWINGS

FIG. 1 illustrates a software excerpt of an embodiment of the present invention: variation chart called SURFACE SPECTRUM FIG. 2a illustrates a manual search indicating 'property product' with total number on each property variation in proportional circle FIG. 2b illustrates a Spectrum Chart Excerpt generated automatically in accordance with an embodiment of the present invention for the product "shoe".

FIG. 3 B shows the process from the desired function to the property. For example if the function dissolving is to be "rapid dissolving" for a solid sugar cube the present invention can start from this selected function and then examine all the property statements know to be linked to that and hence to direct to a liquid in the property spectrum "state", powder in the fragmentation spectrum, or very porous in the porosity spectrum.

FIG. 4 shows an excerpt of a process according to an embodiment of the present invention applied to sugar.

FIG. 5 illustrates a Variation Chart with spectrum examples TRANSPARENCY in accordance with an embodiment of the present invention.

FIG. 6A shows a table conflict expressing strong but heavy OR light but weak. FIG. 6B shows conflict resolution directions property spectrum porosity (left) and fragmentation (right)

FIG. 7 illustrates Property Function Diagrams in accordance with an embodiment of the present invention.

FIG. 8 illustrates a property space-time diagram (9 windows) in accordance with an embodiment of the present invention.

FIG. 9 illustrates a Function space-time diagram (9 windows) in accordance with an embodiment of the present invention.

FIG. 10 illustrates an Elaborated property function diagram in accordance with an embodiment of the present invention.

FIG. 11 illustrates a software excerpt: variation chart: SURFACE SPECTRUM in accordance with an embodiment of the present invention.

FIG. 12 illustrates a property spectrum SOLID→segmented→powder→LIQUID→segmented→liquid→aerosol→GAS→plasma→FIELD (1)

FIG. 13 illustrates a property spectrum SOLID→single joint→multiple joint→flexible→LIQUID→GAS→FIELD (2).

FIG. 14 illustrates an example of symmetrical variation porosity versus fragmentation.

FIG. 15 illustrates an idea generator in accordance with an embodiment of the present invention.

FIG. 16 shows a screenshot of the Directed Variation® Idea Generator in accordance with an embodiment of the present invention.

FIG. 17 shows a screenshot directed variation of a property POROSITY Generator in accordance with an embodiment of the present invention.

FIG. 18 shows ways to increase surface area as an embodiment of the present invention.

FIG. 19 shows a screenshot of the property "color".

FIG. 20A shows recombining 2 faces with 4 variables results in 16 possibilities. FIG. 20B shows that ten variables with each ten variations can bring 1 billion different systems.

FIG. 21 shows degrees of expression deteriorate in increasing state spectrum.

FIG. 22 shows one variation combination of a bicycle frame.

FIG. 23 shows patent database and Web search hits on adjectives+bicycle frame.

FIG. 24 shows dummy patent database and Web search hits on adjectives+lighter.

FIG. 25 illustrates the Final Selected Variations for the bicycle frame.

FIG. 26 shows analogy variables (number of legs) with button to turn in accordance with an embodiment of the present invention.

FIG. 27 shows a Property Radar Plot (with selection of FIG. 3).

FIG. 28 shows functions in/on property plot.

FIG. 29 shows Property Function Mapping in accordance with an embodiment of the present invention.

FIG. 37 shows a property radar plot from which a talent of a product can be derived.

FIG. 38a shows a piston and FIG. 38b shows Adjectives filling the property spectra of 10 properties of a piston ring.

FIG. 39 shows Adjectives filling the variation spectra of 4 extra properties for the piston ring.

FIG. 40A shows a property spectrum for a Piston Ring. FIG. 40B indicates the property occurrence.

FIG. 41 shows property variations over time for the piston ring.

FIG. 42 shows material occurrence in piston ring patent pool.

FIG. 43 shows material occurrence over time (only a selection) for the piston ring.

FIG. 44 shows functional verbs distilled out of patent pool with number of appearance for the piston ring.

FIGS. 45 to 50 shows variations over times for various parameters and features of piston rings.

DETAILED DESCRIPTION

Figure 3A:
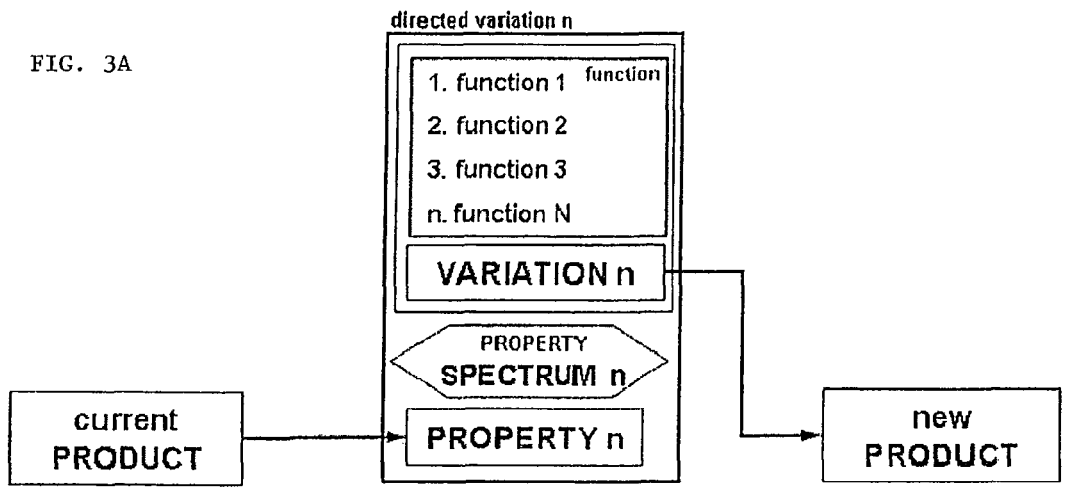
FIG. 3A thus shows selecting a property of the product; exploring the variations in the known property spectrum of that property giving different functions from which new function(s) can be selected, which results in a new product. For example a sugar cube has a shape; varying the sugar cube shape into a beam may bring new functions like stirring or dosing using the sugar beam.

The present invention describes a system including apparatus and a way for preparing data for conducting problem solving, as well as for the process of problem solving and for innovation studies. The present invention aims, in one aspect, at building an effective automatic innovation. Innovation is defined as creating value; value is defined as more of the good (performance, ergonomics, design) and less of the bad (danger, pollution, cost). An aim is for products to function better (to perfect), safer (to be harmless), greener (to be ecological), easier (to be automatic), nicer (to be a better experience) and cheaper (to be economical).

Language

Apparatus or Products or Processes are defined by a first part of speech such as nouns (being definitions of products and called product statements). The term "nouns" includes noun-like phrases or noun statements or any other form of product statement. An analysis of USPTO patents shows that in a pool of 16,000 patents, there can be, for instance, less than 2,000 unique nouns. Of particular importance is the variation of the product, i.e. the variation in a product design that generates a new function or application. A second part of speech such as an adjective (being a definition of a property and called a property statement) when modulating a noun describes a property of that noun. The term adjectives includes adjectival phrases or adjectival statements. Taking the example of a toothbrush, a hollow toothbrush, a flexible toothbrush, a protruded toothbrush, a transparent toothbrush describe toothbrushes with different properties. Such adjectives define properties that can be product variations. The analysis of the same 16,000 patents revealed less than 800 unique adjectives. The adjectives are related or linked to functions, that is the property defined by the adjective leads to a function which are expressed by a third part of speech, e.g. in verbs (being the definition of a function and called a function statement). The term "verb" includes adverbs, verbal phrases and verbal statements. The 16,000 patents distilled less than 700 unique verbs.

Properties and Property Spectra

The difference between a product A and a better product B is that one or more properties of product B function better. A variation or change of the properties, e.g. defined by adjectives, towards a better or more efficient product results in new or better functions for that product which are defined by verbs associated with that function. Properties can be varied along or in a property spectrum, for example a group of stages along a property line. Along the line, the property changes gracefully from one extreme to another, e.g. from completely solid to gaseous. For example: 'a hollow toothbrush' is a variation (change along a property line) within a porosity spectrum, which also includes other properties related to porosity such as porous, spongy or having capillaries. Other property spectra can be defined such as flexibility, geometry, symmetry, surface, state, time, color, transparency, density, size, information content, conductivity, dependability. Each of them has numerous variations or different features called properties. Another example: the property spectrum 'surface' will include protruded, dimpled, curved, (nano) curved, rough, smooth, etc, i.e. all adjectives. 'Surface' is not a property (adjective) it is the reference to a property spectrum, but, for example, smooth is a property (adjective).

Property spectra may be generated automatically through analysis of data repositories containing text documents. Various algorithms can be used to find property spectra. Firstly, the relevant properties will mostly be expressed with the nouns they are modulating, e.g. weight, color, surface). Hence, by language analysis of data repositories, adjectives can be selected if they are modulating product nouns. Grouping adjectives in spectra can be done with any suitable algorithm such as Supervised Machine Learning, Latent Semantic Indexing or by using taxonomies (e.g. lists of topical words) and thesauri (synonyms, antonyms).

Properties and Functions

A property variation of a product brings at least one new or different function. For example, a protruded or dimpled product ("protruded" belongs to a surface spectrum) brings the function holding or cooling, terms related to verbs. A liquid product (property spectrum: "state") brings dissolving or mixing. A porous product (property spectrum: porosity) brings dissolving or filtering. A powder product (spectrum: fragmentation) brings dissolving or filtering. Note that variations in different properties can bring about similar functions. Other functions, for example, include absorbing, joining, cleaning, connecting, preserving, transporting, and floating. Note that the property variation is linked to the function but presented independently of the product. The variation chart in FIG. 1 illustrates the connection of functions with a variation in the SURFACE spectrum independent of any specific product. Variation spectra are abundant (in the hundreds), and property variations are indefinite, only limited by perception and language (vocabulary).

Text Data Repositories

The present invention makes use of a source of information, a machine readable data repository such as a knowledge database or databases with text documents. An example of such a database is one of patents and patent applications, e.g. of the kind maintained by the major patent offices such as the USPTO and also made available to the public via various providers such as Espace, Delphion, STN and Dialog. The data repository can be created by any suitable means. Many multinational companies have information in their own records that relate to many products. Such in-house information can be data-mined to generate the information useful with the present invention. Alternatively or additionally, the data available on the Internet may be mined to create similar information. An initial step in the present invention is the analysis of the data repository to generate tuples such as verb-adjective tuples. The verb relates to a product function and an adjective relates to a product property. A verb will be designated as a "function statement" and an adjective will be designated as a "property statement". The analysis links the function statements to the property statements. To do this various know techniques can be used, e.g. language analysis such as textural, grammatical, semantic analysis, POS tagging, statistical Natural Language Processing, key word searching based on a thesaurus of the relevant part of speech, e.g. adjective, verb or based on a dictionary. As an example, for a function statement to be linked to a property statement, the two may be selected by a "property near function" type of search, e.g. whether the tuple occurs in one clause, or within N words of each other, or in one sentence or in one paragraph, or on one page, etc. The present invention is not limited to such search routines. For example, the text data of the data repository may be tagged and this may be used to do the language analysis. There are many known approaches to parts of speech tagging. Or, a thesaurus of parts of speech may be complied, e.g. nouns, verbs and adjectives, and these lists used to extract the relevant data from the data repository.

Once the data repository has been analyzed by language analysis to generate a list of function statement/property state tuples, these can be stored, e.g. formed into a database preserving the links. The tuples may be ranked, e.g. in terms of frequency (indicative of high usefulness or frequent application) or may be grouped according to some other criteria, e.g. may be grouped by technology, e.g. all relating to medical products. Also the linked list can include other product features also linked to the initial tuple, e.g. manufacturing method that is linked to a certain property or function, a material that is linked to a certain property of function. Also the list may be annotated with time with useful comments as the list is used.

The adjectives that have been found can then be grouped into property spectra. All properties that are related are grouped into one spectrum. Within the spectrum a property varies from one extreme to another. These spectra are then used in other embodiments of the present invention.

Variation Spectra

The spectra determined by the previous step can be used to generate variation spectra for a product. A machine readable text data repository such as a patent database is interrogated by language analysis with a product statement, e.g. a given noun that describes a product to thereby track down the existing adjectives relating to that noun, and then fitting them into or locating them in variation spectra. This gives an idea of how many different product variations have already been considered and are known. As shown in FIGS. 2a and b, one spectrum chart derived from analysis of patent databases reveals the activity in the different property spectra or areas. It illustrates where most of the patents are, and equally important, it illustrates where there are no patents, i.e. the peaks reveal (competitor) activity, the gaps reveal opportunity. The searches can be directed to certain industries or any other current patent classification. The activity can be shown over time and regions. A similar search can be launched on a selection of the internet, or even on internal company data.

Directed Product Variation

The direction in the property spectra variation is defined by a function(s). The addition of a new function moves the product along a property line in a property spectrum. For example, in the transparency spectrum glass may reduce transparency for blocking harmful UV, or be made opaque for privacy. Directed by functions, the product variations can be grouped, for example, in conservative functions (e.g. protection, privacy, conservation) versus reactive functions (e.g. dissolving, igniting, and mixing), which match the left and right end of each spectrum. A product may vary in jumps rather than linearly over time. An example of a stage jump: if polymers have moved from full to foam, the product variation of porous polymers (the jumped stages) still have an opportunity.

The process comes down to evaluating all variations—linked to the function. The process can be summarized in FIG. 3. The steps may be described as follows (FIG. 3A). First a property of a product is selected. This is made into a property statement or adjective. Then using the linked list based on the analysis of the data repository as mentioned above, all functions (verbs) related to the property statement are extracted from the list. As indicated above this list is product independent. By selecting a new function known to be related to the property statement from the data repository, a new function for the old product may be found resulting in a new potential product.

Figure 3B:
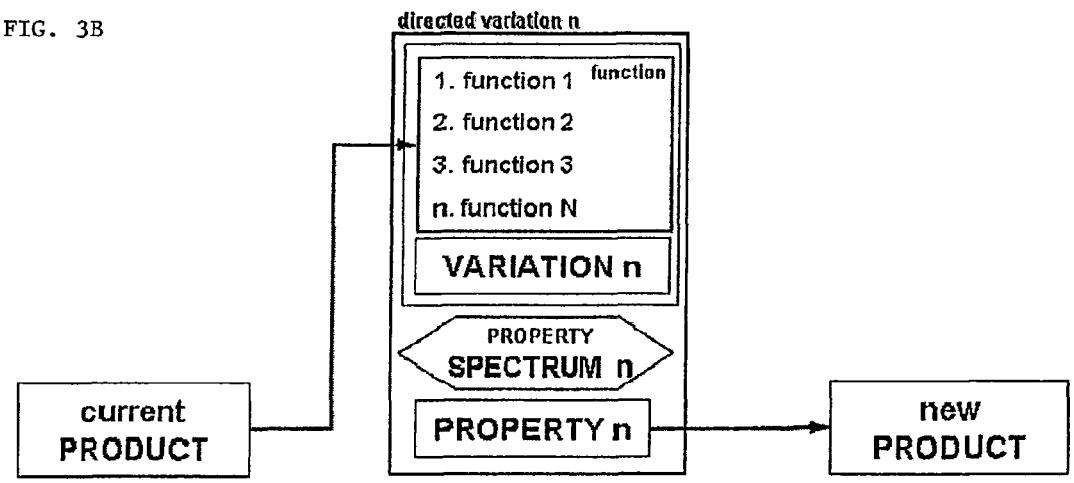
FIG. 3 A) illustrates a process going from property to function, B) from function to property.

FIG. 3B shows an alternative. First a function of a product is selected. This is made into a function statement or adjective. Then using the linked list based on the analysis of the data repository as mentioned above, all properties (adjectives) related to the function statement are extracted from the list. As indicated above this list is product independent. By selecting a new property known to be related to the function statement from the data repository, a new property for the old product may be found resulting in a new potential product. Process A opens new functions or improved function(s) in the old product; process B brings new ways to achieve desired function(s) for an old product. A third option is to identify new markets. As sugar powder has the functions mixing and dissolving, it is also used in other applications, e.g. road works to create the necessary porosity in the road as it dissolves. Variations have functions that can solve other problems.

The process of FIG. 3A or 3B can be repeated for every defined property or defined function respectively—see FIG. 4. FIG. 4 is an example using sugar. Six properties were identified and varied in their spectrum according to function. Example the surface of a sugar cube is flat; variation to a carved surface gives breakability or dosing. The variation in taste gives customisation in coffee.

Variation Charts with Examples

FIG. 5 shows a variation chart. The variation spectra like state, surface or flexibility can be modified. For example the first spectrum state can vary products in solid-liquid-gas-field solutions. FIG. 5 shows the spectrum example TRANSPARENCY. Examples include transparent concrete, transparent home ware, transparent milk, transparent packaging or the UV transparent swimsuit. The functions include viewing, inspecting or illuminating.

Conflicts

When two properties are conflicting, only variation of (other) properties can make them coexist. Example strength and lightweight are conflicting in a table, as illustrated in FIG. 6A.

In order to solve the conflict property variations can be suggested (as shown in FIG. 6B on the left). Methods of the present invention indicate a solution direction in the porosity spectrum. Making a porous table brings a relatively strong and light table. On the right a further direction indicates a variation in the fragmentation spectrum. Effectively, the table in 4 parts is as strong but lighter per unit. Note the similarity with contradiction matrix and principles. This reinstalls symmetry in conflicts as lightweight and strength is the same as strength and lightweight. (Strength and no weight is not the same as weight and no strength). Conflicting properties can thereby be 3 or more dimensional, e.g. strength AND lightweight AND transparency AND flexibility; which greatly enhances the power of conflict resolution tools.

Abstraction, Analogies and Comparisons

From the above it should be clear that abstraction of information in data repositories into properties for providing functions independent of the products themselves is an important step in the present invention. For example, this is consistent with seeing stones as strong enough to build; light enough to throw or sharp enough to cut that generates new products and new applications for old products.

Abstractions are therefore non-perfect comparisons. Non-perfect, though good enough to perform a similar function. Two main types of abstractions can be distinguished:
1) What is/has it?
2) What does it do or undergo?
The first property-type of comparison involves properties of known products. It is based on what it is or has. The second function-type of comparison involves comparisons of functions.

Property Variation

Products, whereby processes are to be considered as products) have properties to perform a function. Function results out of one or more properties. For example, protrusions or dimples, e.g. on the surface of a bowling ball, can give grip. A similar function can be achieved by a different property, e.g. holes for fingers in a bowling ball can also provide grip. See FIG. 7.

As function is the target, so an aspect of the present invention is to find the highest or best value solution, i.e. with the best 'property-function' tuple. There is a direct and an indirect analogy. Take the function cutting, referring to a stone. The direct analogy will look for the property that enables cutting, e.g. sharp edges. A knife, metal plate, broken glass, or even teeth have that same sharp edge, to cut. The indirect way can be to explore ways to have the function cutting, independent of the property of sharp edges. Breaking, tearing, bending or pulling can perform the same function without sharp edge.

If the function is to segment tape, this can be solved by purchasing pre-cut tape. Or even adhesive could be a solution without having a tape. This exploration with properties to achieve the desired function or functions to obtain desired properties is one aspect of the present invention and can be structured in a space-time diagram—see FIG. 8.

Every window of FIG. 8 has properties that can be evaluated to contribute to, or entirely perform the function required. Any of the properties within these windows can therefore be evaluated as to their possible contribution to the desired function. Finding properties in a machine readable data repository involves seeking property statements, e.g. adjectives related to properties that a product can have. For a property analogy, '9 windows' in FIG. 8 explore the possible analogies in space and time. The more these properties are linked to the product's required function, the more they are relevant to the analogy. Properties are linked to science, e.g. science related to surface, strength, or porosity. This is mainly expressed in the product statements, e.g. adjectives. The property analogies are thereby derived from similarity of adjectives.

Function Variation

Likewise a property can also provide different functions. The above has elaborated on property variation as a means of creating new, better, cheaper, easier or nicer functions. Whereas properties are linked to science, functions are linked to technologies—see the table below.

| SCIENCE | Property | 'it is/has like x' | direct analogy |
|---|---|---|---|
| TECHNOLOGY | Function | 'it also undergoes/does x' | indirect analogy |

Analogies are, for example: it ALSO cuts, cleans, moves, dries or joins; these are all verbs that express the same function. They can be grouped in active ('doing') and passive ('undergoing') functions.

To direct a variation in the problem solving, there are two possible analogy routes—see FIG. 9 which is the function embodiments of the present invention to be compared to FIG. 8. These are a more disruptive kind of analogy as they can develop from a completely different property providing the same function. Referring to FIG. 10, the function, for example water cleaning can be achieved before (preventive—cleaned well), or after (corrective—boiling). The sun shines, and that function includes UV light that can also provide clean water from the top windows (1,2,3). Note the strong link, as properties and functions are linked, between FIGS. 8 and 9. The difference in the searching presented by the present invention, however, is to look for the same property providing the function, i.e. directed analogy, and looking for the function rising out of a different property, i.e. indirect analogy.

Direct and Indirect Analogy

The direct and indirect analogies are illustrated as in FIG. 10. It defines the solution design freedom of an innovation engineer.

The simple diagram of FIG. 10 describes a product, having properties that provide a function creating a solution. The design freedom opens (left) other properties that can provide that function. This is a list of technologies that can provide the feature 'assemble'. Again, all of these technologies are based on properties such as magnetism, geometry, pressure or bonding forces. This is mainly used to create alternative solutions for the same function. The other list (right) provides possible new functions that can be achieved by the properties of a known product. This is mainly used in creating new solutions that can perform the function and other desired functions.

Property Function Analogies

Referring to FIG. 1 the property variations are organized in functional groups. In the screenshot of FIG. 11, the variation in the property surface is expressed (the SURFACE SPECTRUM). As discussed above, many functions can arise from one property. Here the first 12 functions are illustrated. The folders are assembling examples across industries that use a surface variation for e.g. holding, transferring heat, draining or breaking.

The folders contain both product and patent information for example. This structure, connecting properties to function examples, can be searched in a reverse manner as well. That is, search for all property variations that can provide a function, e.g. fast dissolving. The latter will provide a listing including fragmentation to powders, fibrous materials, high porosity materials or liquid.

In FIGS. 12 and 13 two property spectra are shown, e.g. derived from the analysis of databases as described above.

In directed variation of products in accordance with the present invention such a spectrum has been defined as 'state change'. The variation solid, liquid, gas, field each loose a degree of expression; solids can have sound, touch, form, taste and smell, where liquids loose form, gasses have nor form or taste, and fields have no form, no taste and no smell. This shows that the finer the element, the lesser the degree of expression, but the higher the degree of efficiency. For power and energy, fields are more effective than gases that are more effective than liquids, that are more effective than solids. This introductory example again shows that the direction of variation is only defined by the required function. Example variations of state include train rails (solid) to Maglev (field), Cutting with solid knife, water rays or laser, or extinguishing a fire with sand, with water, with CO2 gas or with an explosion, the latter applied for extinguishing burning oil sources.

Symmetrical Variation

When a person wants sugar in a cup of coffee, than a sugar cube can be selected (i.e. a 'solid' object which is porous, it has 'gas' in it), or a sachet of powder sugar (i.e. air 'gas' with 'solid' particles). The solution is symmetrical, but the main function 'dissolve sugar in coffee' is the same. The secondary function 'pore powder' or 'drop a cube' vary.

Every product variation direction can be symmetrically mirrored—see FIG. 14. The variation of the property porosity is symmetrical to varying the degree of fragmentation.

Similarly, inside a property variation like surface change, a symmetry can be found by adding protrusions (outwards) or bringing in machined recesses (inwards), for the functions related to creating more surface area like cooling, grip, or breaking.

Sprays can be interpreted as symmetrical to foams as sprays are 'liquid segments in gas' and foams are 'segmented gas in liquid'. Switching from spray to foam is a common solution to some problems; see for example car wash foam, dish wash foam, cleaning foam and sunscreen foam.

Such symmetries can be exploited in directed product variation in accordance with embodiments of the present invention. For example variation of the property 'flexibility'; e.g. adding flexible joints to hard parts (like a cardboard box) is symmetrical to adding hard joints in flexible parts (a plastic bottle). Symmetrical variation brings a new tool to product design as it allows to achieve the same main function with a completely reversed system. A spray can be developed for a hygiene application, but a foam may provide added advantages. More symmetry is defined in absorption vs. emission, prior action vs. post action or pauses vs. peaks, for example.

New Product Specification and Development

Directed product variation according to embodiments of the present invention is a stepwise process to innovate products and processes. Important product differences are expressed in adjectives. Adjectives describe a property variation. The property variation is linked to a function in a property/function tuple. This translates into interrogating a machine readable text database to find adjectives linked to verbs.

With the rules shown in FIG. 15, in one embodiment of the present invention, a computer based interface tool automatically creates the text below as an output associated with a product, e.g. applied to a toothbrush, a brick and a pen. The sentences in the examples are assembled below from the known properties and related function. The property or adjective is in italics, the function or verb is bold, valid generations are underlined. The method of generating such output texts is based on the previous analysis of function/property tuples from a machine readable database having text documents as described above. The tuples link together the property and the function known to be linked with that property.

EXAMPLES

Toothbrush

Example 1

The Property to be Investigated is Porosity

A hollow or porous TOOTHBRUSH is easier to transport as it reduces weight, a hollow TOOTHBRUSH will have less material. By making a hollow or porous TOOTHBRUSH your TOOTHBRUSH can contain another material. A hollow TOOTHBRUSH allows to hang your TOOTHBRUSH. Open holes in a porous TOOTHBRUSH will improve heat transfer. Closed holes in a porous TOOTHBRUSH will improve the insulation properties. A porous TOOTHBRUSH can improve the strength to weight ratio.

Example 2

The Property Spectrum to be Investigated is "Surface"

Consider a protruded or carved TOOTHBRUSH. A protruded TOOTHBRUSH will be easier to grip. If a TOOTHBRUSH is in touch with moving air, a protruded TOOTHBRUSH reduces aerodynamic drag, a carved or protruded TOOTHBRUSH will also improving traction, or eventually improve drainage. A protruded TOOTHBRUSH will have more surface area which will improving heat transfer properties. A carved TOOTHBRUSH can be made to look nicer. A carved TOOTHBRUSH can break easily at the carves.

EXAMPLES

Brick

Example 3

The Property to be Investigated is Porosity

A hollow or porous BRICK is easier to transport as it reduces weight, a hollow BRICK will have less material. By making a hollow or porous BRICK, a BRICK can contain another material. A hollow BRICK allows to hang a BRICK. Open holes in a porous BRICK will improve heat transfer. Closed holes in a porous BRICK will improve the insulation properties. A porous BRICK can improve the strength to weight ratio Example 4

The Property to be Investigated is Surface

Consider a protruded or carved BRICK. A protruded BRICK will be easier to grip. If a BRICK is in touch with moving air, a protruded BRICK reduces aerodynamic drag, a carved or protruded BRICK will also improving traction, or eventually improve drainage. A protruded BRICK will have more surface area which will improving heat transfer properties. A carved BRICK can be designed to look nicer. A carved BRICK can break easily at the carves.

EXAMPLES

Pen

Example 5

The Property to be Investigated is Porosity

A hollow or porous PEN is easier to transport as it reduces weight, a hollow PEN will have less material. By making a hollow or porous PEN a PEN can contain another material. A hollow PEN allows to hang then PEN. Open holes in a porous PEN will improve heat transfer. Closed holes in a porous PEN will improve the insulation properties. A porous PEN can improve the strength to weight ratio Example 6

The Property to be Investigated is Surface

Consider a protruded or carved PEN. A protruded PEN will be easier to grip. If a PEN is in touch with moving air, a protruded PEN reduces aerodynamic drag, a carved or protruded PEN will also improve traction, or eventually improve drainage. A protruded PEN will have more surface area which will improve heat transfer properties. A carved PEN can be designed to look nicer. A carved PEN can break easily at the carves.

FIG. 16 shows a randomised text generated automatically in accordance with the present invention. Based on each and every property, pages of variation suggestions are presented to the user like these. The more the functions are known for the product, the more relevant the suggestions will be. Functions can furthermore be classified in a performance group, a sustainability group, a convenience and a cost reduction.

Once a certain function is accepted, the user is presented with other variations that can achieve the same function. For example if a variation towards powder material is selected for the function dissolution, then a porosity increase and a state change will be suggested as other ways to achieve that function. The screenshot FIG. 18 shows variations of the property SURFACE. Under the function 'increase surface area' reads 'see 6 more ways' and under the function 'improve heat transfer properties' reads 'see other way'.

This indicates that increasing surface area can be achieved with six other ways, namely shape, surface, geometry, asymmetry, porosity or fragmentation. Similarly improving the heat transfer can be done by changing the surface but also by changing the porosity (to open pores).

Examples of the color changing tap water; red for hot water and blue for cold water, is abstracting the same innovation as the color changing door handle, green for entrance and red for occupied: both examples are functional use of color variation.

Furthermore, the kind of functional use of color can be classified. FIG. 19 shows the first 4 classifications of functional color use. Improve the aesthetic appearance is the first folder, full of examples that use color for esthetics. The second folder contains examples where color is used as a warning indicator, and so each of the pictures shown in figure eight represent a classification of one particular function that can be achieved by varying the property color. By evaluating numerous examples in each classification, it becomes very easy to place a successful analogy to a product.

Exponential Growth

The 'Variation' part of directed product variation in accordance with the present invention can be implemented as Attribute Listing. A product or a system is divided into parts, and alternatives ways of achieving each (sub) function are evaluated, recombining to new variants of the product or systems.

Selection becomes an issue even with few variables and limited variations, the possibilities grow exponentially. Simply put, consider 4 variables with binary variations, this will result in 16 systems (incl. the initial systems). FIG. 20 A exemplifies two faces (binary variation) of 4 variables (nose, eyes, month and head shape) given no subtractions or additions can be made. A variety of 16 different faces can be created. FIG. 20 B illustrates the exponential relation between variables and variations; 10 variables with each 10 variations produce one billion possibilities.

Whilst eliminating some attributes or properties with lesser importance, the problem of selection is a addressed with the extension of the technique: Morphological Analysis. However, the technique gives limited difference and easily falls back into arbitrarily choosing permutations.

Value engineering has brought hierarchy in the functions wanted. Similarly, in directed product variation functions are related to properties. Therefore one can greatly reduce the options or at least prioritize the variations. If the main function describes degrees of expression like shape, smell, taste or touch, variations in the state spectrum will be deteriorate the more they evolve towards field (see FIG. 21). Though if energy efficiency is the main function, then the variations will improve towards field.

Selection by Elimination or Function

Directed variation translates the variables into property spectra, in which every property is linked to one or more functions. Let us assume we can identify 10 properties of a system (example property 'porosity'), which each can vary in a scale of 3 (example full hollow porous). The amount of different combinations can be calculated by number of properties to the power of variations, i.e. $3^{\wedge}10=59049$. As a case example, (and not toothbrush for once) let us consider a bicycle frame.

Again, although the table in FIG. 22 appears rather simple, 59049 variations can be made. ($3^{\wedge}10$) But only some moves are winning. One way to start is to look at the possible variations and run a patent search. Flexible frames, jointed, segmented, curved or carved frames will surface. (FIG. 23). This search is limited and mostly describes only one property in which a variation has a claimable function. The main function is strength, holding the bicycle together, then the variations expressed in liquid frame and field frame, lose the shape stability, can be eliminated, dropping 39366 possibilities. As possibilities grow exponentially, selection by elimination reduces the options exponentially. One variable has dropped 59049 options to 19683. ($3^{\wedge}9$).

Selection by Patent Search

With the adjectives of FIG. 22, a quick patent and web search can reveal existing variations in the-adjective-bicycle frame.

Some examples of 'adjective-bicycle frame' are given in FIG. 23. The parted bicycle frame on the left allows a more compact transport. The flexible bicycle frame gives better suspension. Although the search is performed on adjectives and not on verbs, it presents the functions (verbs) that are claimed. The search charts the activity in the different variations, also uncovering where no activity was found. The latter can be the more important as it gives a unique new variation to the product. This selection procedure gives some insight, though does not reduce our 19683 possible variations. For that the value equation needs to be considered.

Patent Classification

Before going deeper into value selection, consider the patent search above applied to a new example, the lighter. Within the patent database, all the lighter patents can be called forward, organized by adjective—lighter.

A further classification can be made by separating the claimed functions per variation. 345 transparent lighters of which different functions like inspection, security, or more design based features could be claimed. A multifunctional lighter can be claimed with a bottle opener, or a functional light. This sort of analysis grows the database of generic functions, that which an adjective can perform. Adjective-verb; or property-function searches prove to be an effective way to classify knowledge across application domains.

Selection by Value Factor

Value equates as good minus bad. Good=performance (better function); bad=1. harm (safer or greener function), 2. interface (nicer or easier function) and 3. cost (cheaper function. The spectra transparency, color and senses can be considered interface (design) features. This is case specific, e.g. transparency is performance in case of a window. Ignoring the interface variation, drops another 18954, bringing us to an almost manageable 729 variations. (3^6)

If the aim is strength/weight ratio for usage and transport, the variations shape and porosity will go to the left. Two properties (point and full) fall, dropping another 405 variations. The remaining options count 324, which is manageable. (3^4*4)

One can argue that symmetrical is the cheapest way to produce the frame, and eliminate the symmetry variation for the value factor cost, dropping 216 options to 108. (3^3*4).

Figure 25:
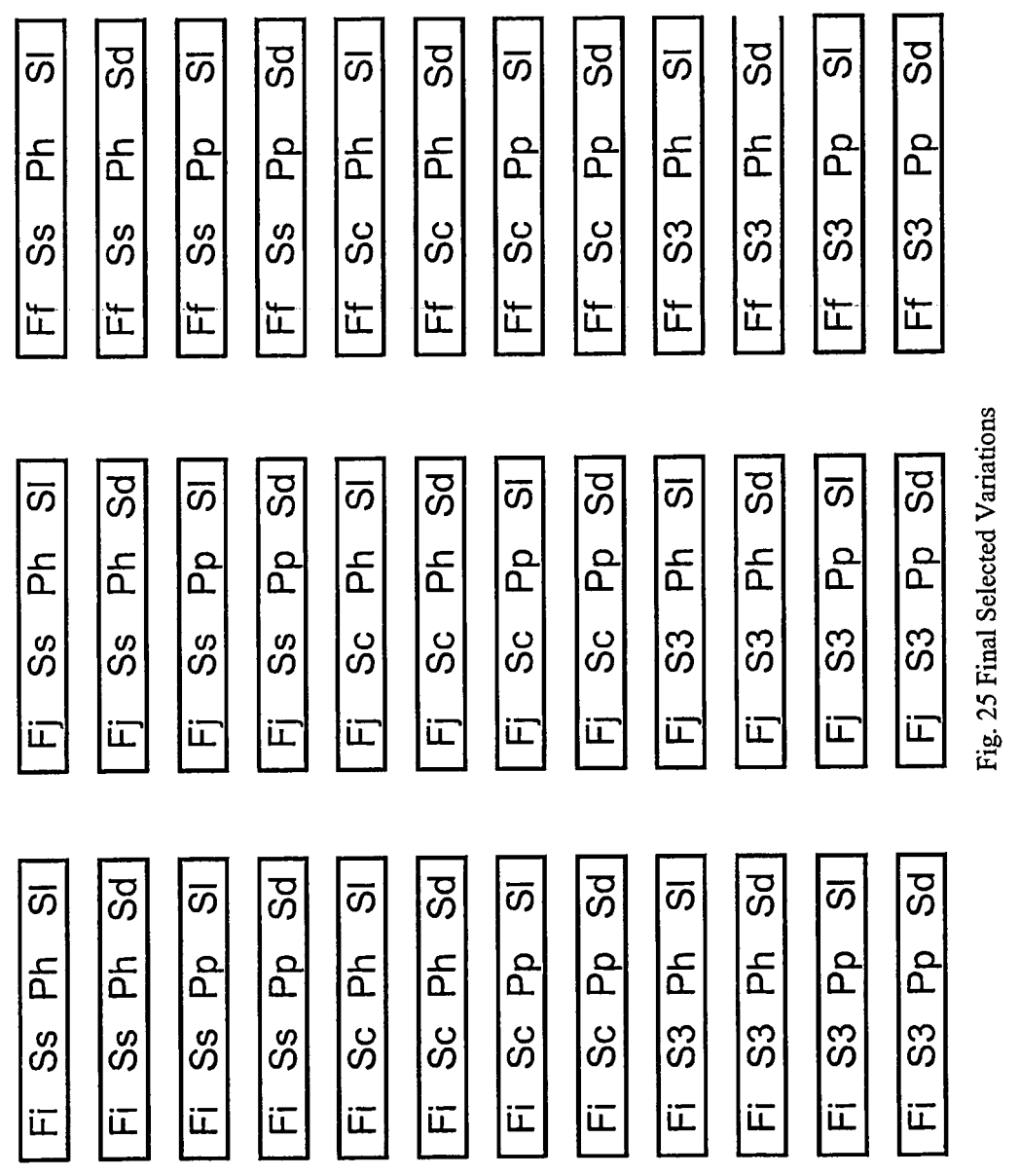

Assuming the bicycle frame is to be constructed as one part, 72 variations drop to 36 possibilities. This gives (FIG. 25): Flexibility (immobile Fi, jointed Fj, flexible Ff), Surface (smooth Ss, carved Sc, 3D Carved S3), Porosity (hollow Ph, porous Pp) and Shape (linear Sl, 3D shape Sd).

Prior Variable Selection

A classical 'trap' type of exercise is to ask a large audience to draw a table. 90% if not all drawings will be a solid table blade with four legs, which is indeed a table. But one, two or three legs can also make a table. The number of legs is a variable property. It is like a button to turn or adjust the design as shown in FIG. 26.

The number of legs is one button to turn, but if inspected closely, the table is full of buttons to turn. The represent the properties that can be varied to achieve a new function. Buttons include transparency, strength, weight, flexibility, colour, surface, shape, or unity. They define the amount of variables that will form the bases of the solution space. Each setting is connected to functions.

Property Plots

As alternative to the evolutionary potential plots, in which property and function variations are mixed, it is cleaner to create property plots only. They are built as a radar diagram in which each axis is defining a property spectrum (a button to turn). The set of properties out of FIG. 22 creates the property plot (FIG. 27). Here the total of only outward moves defines 17496 variations. Again, depending upon the required function, also inward variations can be considered. The beauty of a pure property plot, is that it is directly linked to a definite set of functions.

Functions in/on Property Plots

Whenever a property is well varied the resulting system will have new or improved functions. The other way round, when a desired function is known, a priority of variations can be given. FIG. 28 shows the property radar of the bicycle frame. If the bicycle needs to be transported, a porous bicycle will be lighter, a parted will be easier to store and lighter to carry per part, and a jointed or flexible bicycle might just fit in the trunk.

Holding the frame might improve through surface finish, by designing grip shapes, or even by adding holes to grip it (like a bowling ball does).

The analogy proves an easy interface to the design options. In the case of conflicting properties, solution routes can be prioritised in a similar fashion, i.e. where 'to turn' to solve the conflict. For example, if the strength of the bicycle frame is compromised by making it hollow, keep turning the porosity to many small pores and the strength will restore.

Property Function Mapping

The property function relation of directed product variation according to the present invention allows a good navigation for mapping new variations.

Step 1: Write down all properties identifiable around a product, e.g. a bicycle frame.

Step 2: Define in which variation spectrum each property is and connect the initial property to the closed description. Write the variation spectrum completely, i.e. all the adjectives describing the stages (in this case 3). Underline the current stage.

Step 3 Evaluate the remaining stages functionally, i.e. what function could they bring to the product. Note that the current stage can also bring new functions, for example the bicycle frame is hollow; it could remain hollow though add the function 'contain', a pump or a drink.

In FIG. 29, the inner circle defines the product property perception. The secondary circle contains the adjectives—the property spectra. Variations in these properties will fuel new ideas, bringing better or new function—the outer space.

The second circle describes the talent of the product whereas the outer zone charts the functional need and wants of the customer.

Summarizing: innovation through directed product variation comes down to listing a product's properties and changing those properties along a variation spectrum. Changes are expressed in adjectives, and linked to science. Successful changes result in new or better function, these being expressed in verbs, and linked to technologies.

The generation of variations is exponential, though by structured elimination procedures, the drop of possibilities is likewise. Searching existing variations on the web and patent database prove insightful.

The more drastic selection procedure is conducted by value factor. The value equation gives a four wise focus, dropping the total of available. Depending on the required function, a directed variation can eliminate the counter directed options.

Furthermore the analogy of 'buttons to turn' with 'properties to vary', proves very user-friendly. By purifying evolutionary plots into property plots, each axis describes a property spectrum. Depending on the desired function(s), the user is informed which 'button to turn'.

Finally, the property/function relation of directed product variation allows a good navigation for mapping new possibilities.

Step 1: define your product perception
Step 2: create the talent of the product
Step 3: shop for functional variations Descriptor Comparisons The present invention in one embodiment proposes a structure to compare products, and extrapolate relevant analogies to any specific domain. Opening properties and functions in space and time provides a checklist of all candidate solution routes. In a further step, for each product (noun) a series of descriptors may be formed to characterise that product, i.e. to define its "talent". Such descriptors may include any of: properties listed as a string, functions listed as a string, lists of tuples of functions and the related properties as a string or any other list including descriptors of the product that can be derived by analysing text based databases such a manufacturing method or materials used. Such a descriptor can be derived for example, from the talent of a product, e.g. from FIG. 29 this could be {one sense; symmetric; hollow; smooth; immobile; unicolour; linear; solid; whole; opaque} or {one sense, touchable; symmetric, irregular; hollow, empty; smooth, round; immobile, strong; unicolour, grey; linear, bars; solid, hard; whole, one; opaque, opaque}.

A product descriptor may be used to identify other products which have a relevant similarity or analogy with the product under investigation. This is done by comparing the descriptor with descriptors of products obtained by language analysis of databases with text documents and ranking the comparisons in accordance with a degree of similarity. Products with a high or higher degree of similarity can then be analyzed for product variations e.g. product variations over time. Once these product variations are found, they can be applied to the product under investigation to see if similar product variations would be generate new and useful products.

In order to assess the similarity between descriptor strings, the descriptor strings for the product under investigation and those of other products derived from language analysis of databases containing text documents such as patent databases are generated and compared. A descriptor based similarity comparison may be made by any suitable technique, e.g. by the following five distinct steps:

1) generation of product descriptors from a database or databases, e.g. a patent database;
2) generation of the test descriptor for the product to be investigated;
3) similarity calculation between the test descriptor and the product descriptors;
4) sorting of the products having a higher similarity with the test descriptor, and
5) investigating product variations of the products having closely similar descriptors to see if these product variations could be applied to the product under investigation.

The similarities can be obtained any suitable algorithm, e.g. for instance by calculating the normalized distance between each pair of descriptors:

$$d = \sqrt{\frac{\sum_{i=1}^{n}(s_i - r_i)^2 w_i}{\sum_{i=1}^{n} s_i^2 w_i + \sum_{i=1}^{n} r_i^2 w_i}}$$

with d being a normalized arbitrary distance, n the number of descriptor values in the string, $s_i$ the i'th point of the product descriptor, $r_i$ the i'th point of the test descriptor, and $w_i$ a i'th weighting factor that can be any value between 0 and 1. A large similarity is indicated by a small d, and vice versa. The arbitrary distance may be obtained, for example, by assigning a value to each of the descriptor elements that represents its distance along a property line within a property spectrum. For example, the radial distance from the origin to the property may be taken from a map such as shown in FIG. 28, e.g. the value is assigned based on the ring number in which it lands from 1 (at the center) to 6. In this way the property is quantified along the property line of a property spectrum.

Similarity comparisons using language analysis will generally require a more complex algorithm than that described above. The reason is that different authors might use different words for describing the same thing. The software that carries out the similarity processing preferably allows for these variations. To do this it can automatically augment the simple descriptors mentioned above with known synonyms. To do this the program may interrogate thesauri or dictionaries, e.g. either local or on a network such as the internet. Such refinements can include allowing for different spellings, e.g. American and British spellings. Dedicated dictionaries can be prepared that provide the most useful alternative forms of words for use as alternative descriptors. Further the adjectives may be used in a stylized form, e.g. reduced to their base form through stemming. Such alternative forms may be automatically used in the comparison process or the user may have control over selecting one or more of these alternatives for the comparison even to the point that each alternative word may be presented to the user for acceptance or not before the comparison algorithm is run.

The present invention also includes that in doing product comparisons the inverse of a descriptor may also be used.

An example of this procedure is for example that a tea bag has a lot of similarities to a bag for cooking rice. Hence product variations known for tea bags may be considered for application to rice bags and vice versa.

A more detailed example is given next illustrating the use of the talent of a product.

Case: Directed Variation of the Piston Ring

FIG. 37 is a Property Radar Plot, all properties are for function. Looking at the case 'piston ring' (FIG. 38a) all patents within the ECLA Code F16J9 were collected. The total of title, abstract, description and claims were analysed. The pool counted 2666 patents (over 1975-2005). Out of this pool, 367 unique adjectives were distilled, of which 70 proved useful. Fourteen useful property spectra were selected of which ten are shown in FIG. 38B. The adjectives are placed within the property spectra, with the frequency of use; i.e. 'hollow' is part of porosity spectrum, and occurred 173 times.

Within the pool of adjectives, synonym are clustered that relate a distinct property. They do represent differences in properties of a piston ring. These also include temperature, dimensions, speed and strength, which are not typically mentioned in TRIZ-based trend tools (see Hands-on Systematic Innovation D. M. Mann, CREAX press, 2002). FIGS. 38b and 39 illustrates these property spectra.

This gives an overview on the patent activity of each property. Some properties are already applied multiple times, while other properties still stay unused. The white spaces coming out of the software are poly (multiplicity), 3D+active (surface), fragmented (unity), reactive (activity), porous (porosity). Poly looks interesting, is there an advantage of having more than 3 piston rings? Although surface is an important property to obtain a good seal with lesser friction/heat, it isn't that much used for the moment. For oil rings segmented is already used. Is there an opportunity in doing the same for the other piston rings? As most of the material used is still passive, there is an opportunity in having a reactive piston ring.

Talent of the Piston Ring

The data of FIG. 38b and FIG. 39 allow constructing a property spectrum of the piston ring. This property spectrum represents some of the activity of design within the area of piston rings within the last 30 years.

Based on the most patented properties as shown in FIGS. 38b and 39, FIGS. 40A and B illustrate a property plot of a piston ring. Note that the variations are defining an outer circle as well as an inner circle. The figure does not display none patented properties, although those are at least as important to consider in the creation of new designs.

FIG. 40 B depicts the occurrence of properties within the patent pool.

Some noise is experienced in the current graphs as the one patent can mention a property once or one hundred times. So, 'flexible' is mentioned 175 times doesn't mean there are 175 patents on flexible piston rings, as a patent mentions it more than once.

FIG. 41 illustrates a selection of property variations over time. It shows that the properties flexibility, multiplicity, geometry, state become more and more used. This gives us a clear indication on what the industry is or isn't working on.

Multiplicity here is overestimated as there are 3 piston rings.
Material Occurrence By analysing adjectives, some indication of material use can be made. A material is often expressed as adjective, e.g. a plastic piston ring or a synthetic piston ring. Most materials however are nouns, e.g. a piston ring made of steel. A material search through the data gives FIG. 42.

The difficulty with piston rings is that a large range is covered; first there are 3 types of piston rings:
1. Compression ring,
2. Scraper ring,
3. Oil flow ring.

Second there is the material of the piston ring versus the coating of the piston ring. But taking this in account and comparing the results known by the art versus the software generated data, similar materials are obtained Alloy, Steel and Iron.

For coatings for both searches chromium is the most used coating material, together with carbon, titanium. An important coating that isn't founded is nitriding, as it is not an adjective/noun.

FIG. 43 plots the material occurrence over time. It is only a selection of the literature in FIG. 42 and shows that the discussions in patents on nickel and cobalt were quite popular in the 70'es where as recently the main topics such as resin or chromium coatings have taken over.
Connecting to Functions Cross-referencing the verbs of the patent pool with the lit of functional verbs out of a CREAX function database (http://function.creax.com) delivers 23 verbs shown in FIG. 44A. FIG. 44B is a wider selection of functional verbs. Both lists represent actions that have importance in the area of piston rings.

Figure 30:
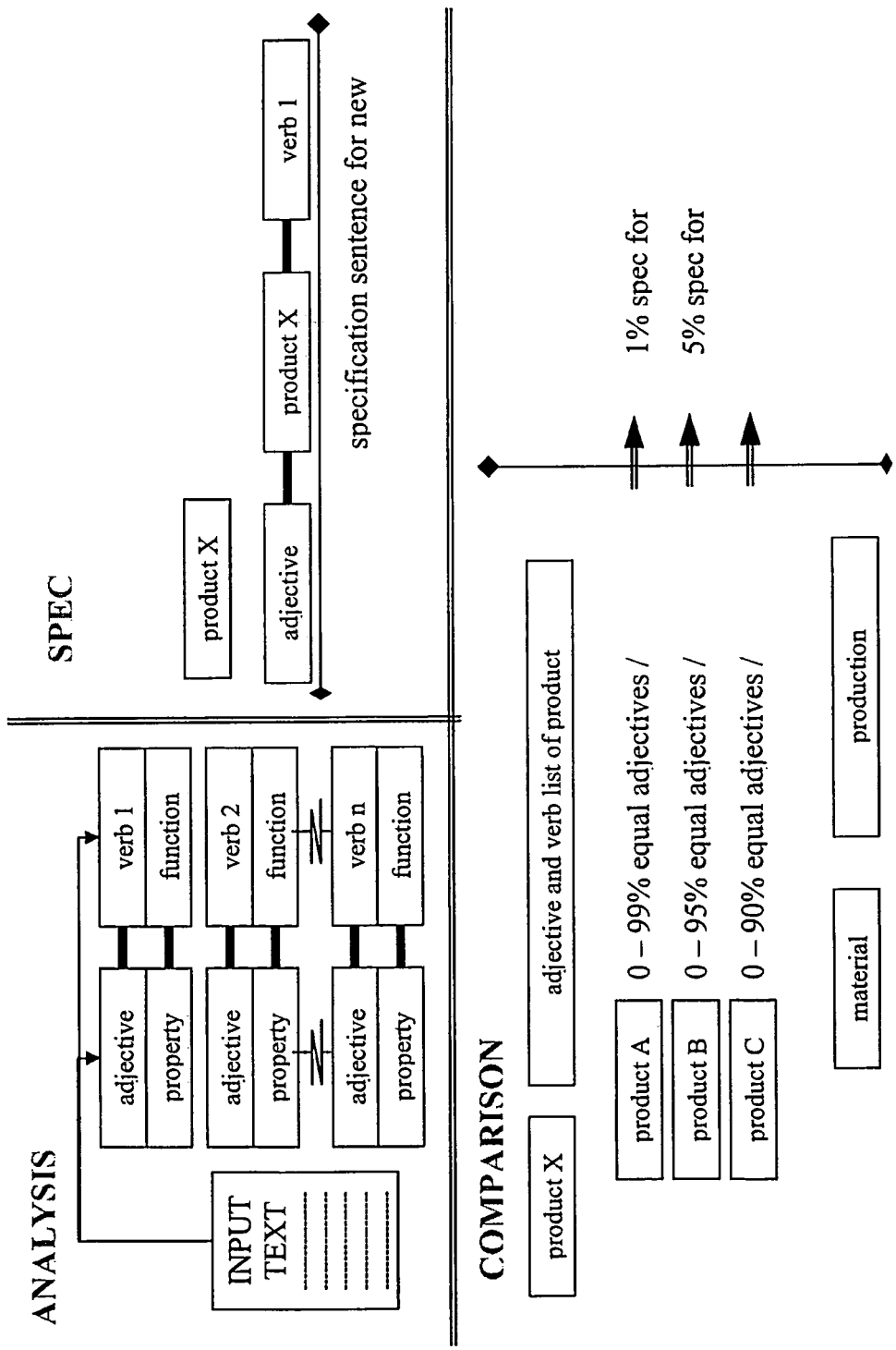
FIGS. 30 to 36 illustrates processes each of which is an embodiment of the present invention.
Figure 31:
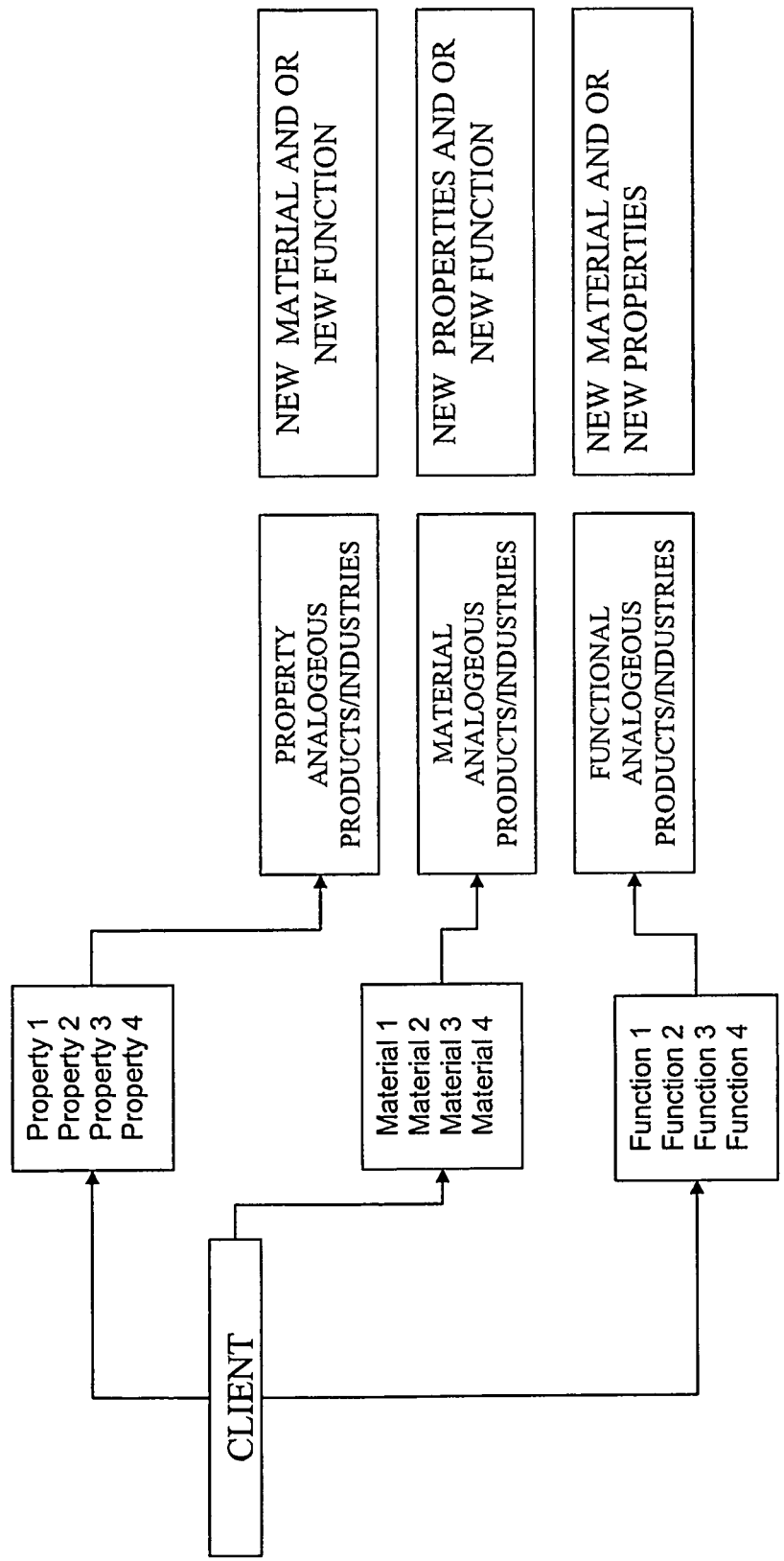

Comparing the results known by the art versus the software generated functional verbs data, wear is in both cases the most important. That the software mentions cast is normal, because casting iron was used a lot as material. For the piston ring heat-resistance, peeling, friction, scuffing is also important, of which only scuffing is mentioned.
Property Spectra Over Time In addition to FIG. 38 it is important to evaluate how the property evolves overtime. FIG. 47 indicates that still a lot of work is done on smooth piston rings, while protruded will give less heat and friction. FIG. 45 gives the impression that a lot of work is done on fluids, referring in this case to the oil used in the piston. FIG. 46 shows that a there is recently more patent activity on linearity in piston rings, while curvature in piston rings could have advantages in heat and friction development. FIG. 48 indicates more work on hollow piston rings, FIG. 49 bent rings, FIG. 50 on active rather than passive or reactive.
Final Comments FIG. 30 shows a summary of some of the main embodiments of the present invention. "Analysis" represents the language analysis of data repositories to generate an indexed table linking together product properties with functions. "Spec" relates to the automatic generation of sentences or text descriptions of a product associated with new properties and functions. Ideally this should be in a suitable language form such as an easy to read sentence or may also be spoken verbally to the user. Finally, "Comparison" relates to associating a product with a descriptor, e.g. function/property tuples and then analyzing data repositories to obtain other products that have some similarity to the product under investigation by comparing the similarity between the descriptors of the product under investigation and other products. The found products can be ranked in accordance with their degree of similarity. Then product design variations know for the found products may be applied to the product under investigation to find out if new and useful products may be obtained by this route.

Figure 32:
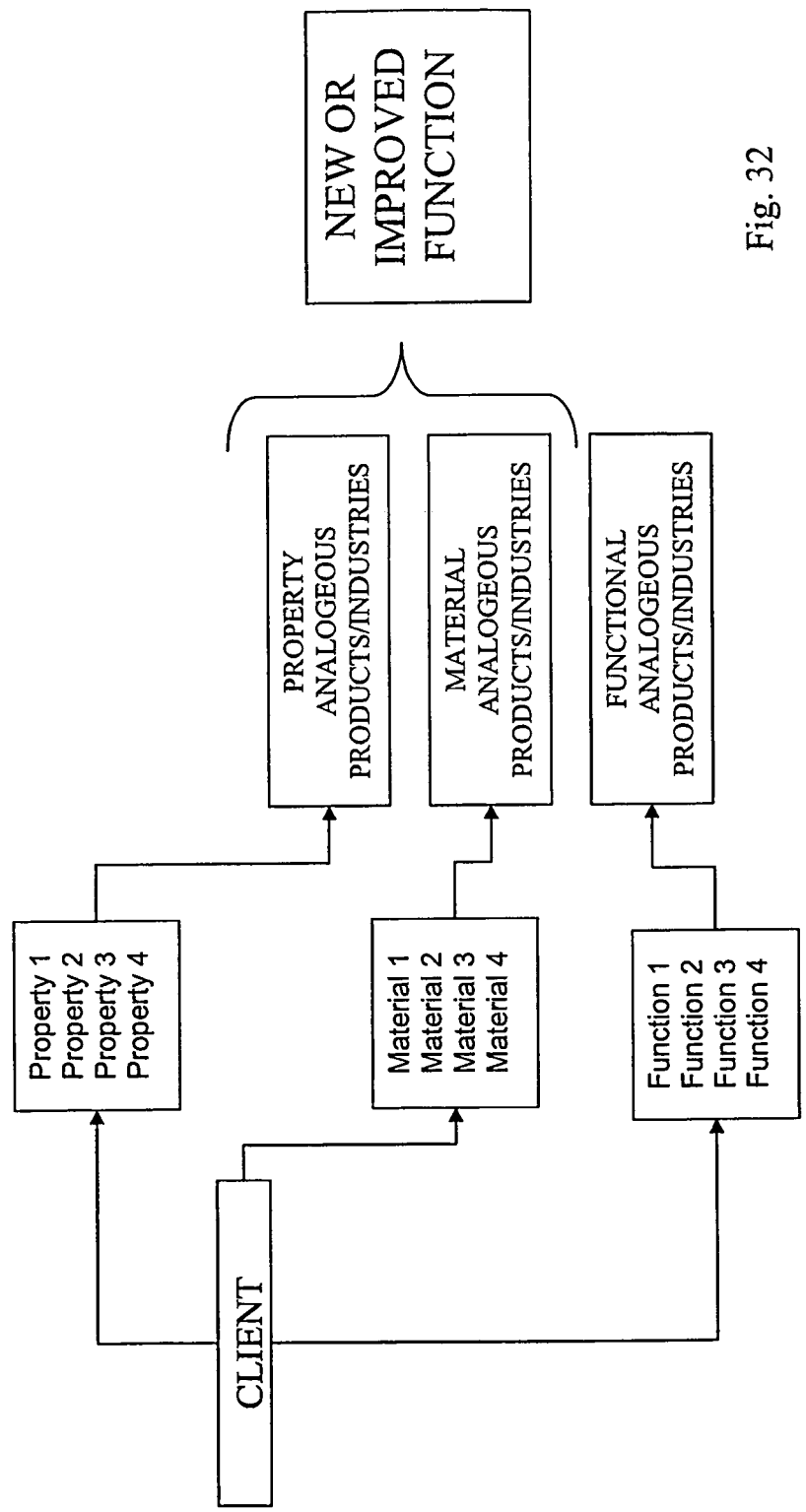
Figure 33:
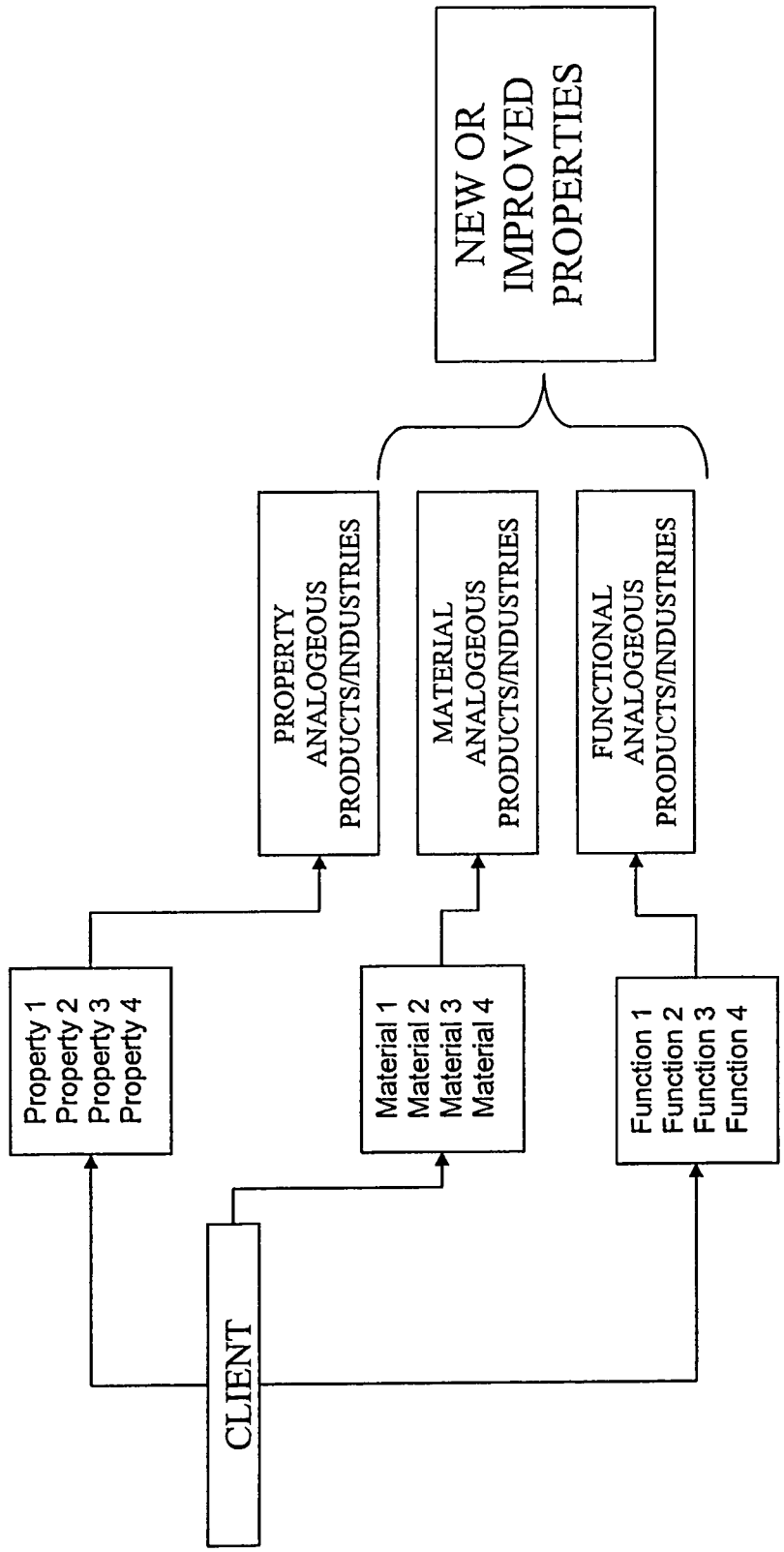
Figure 34:
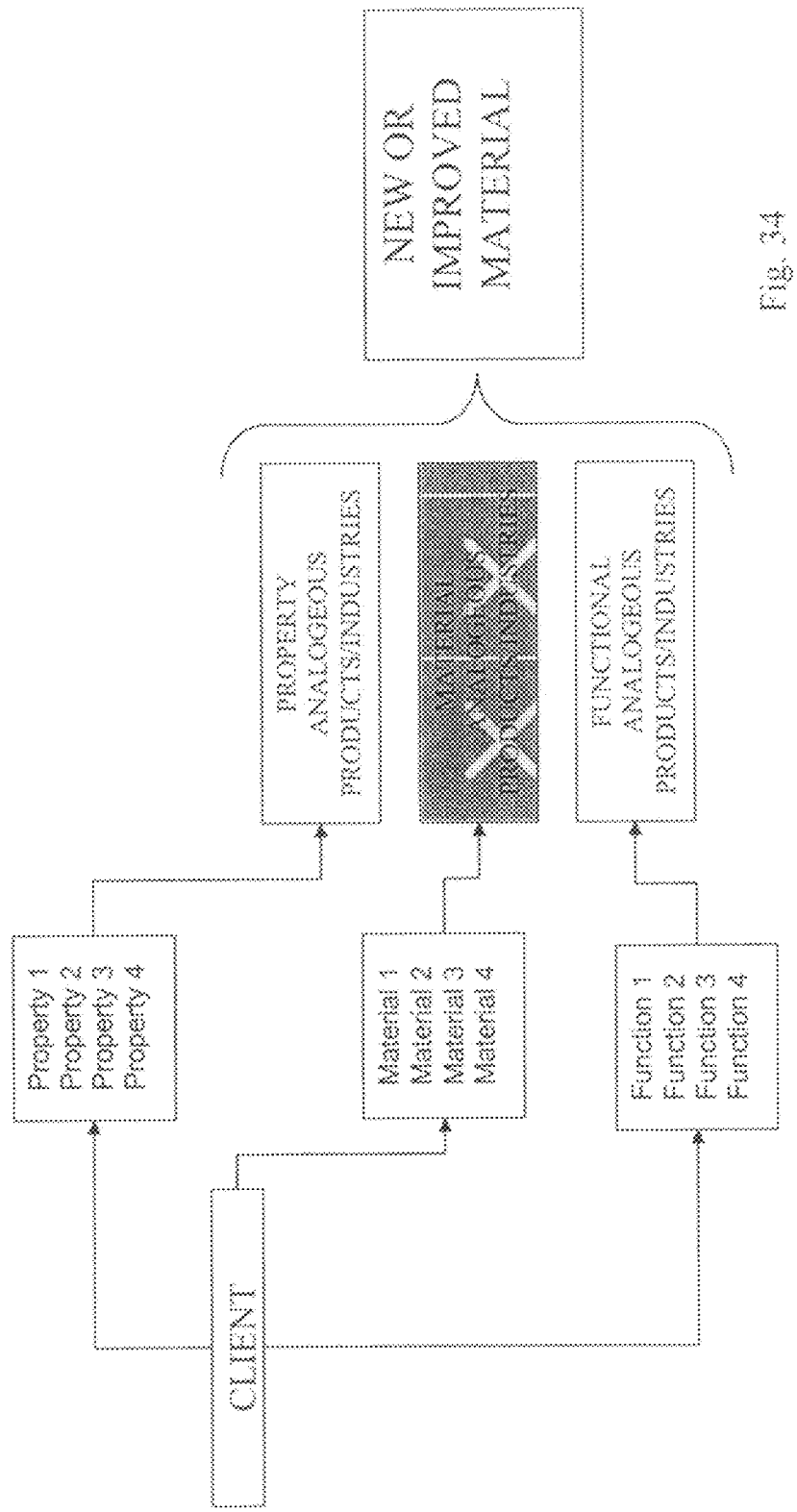
Figure 35:
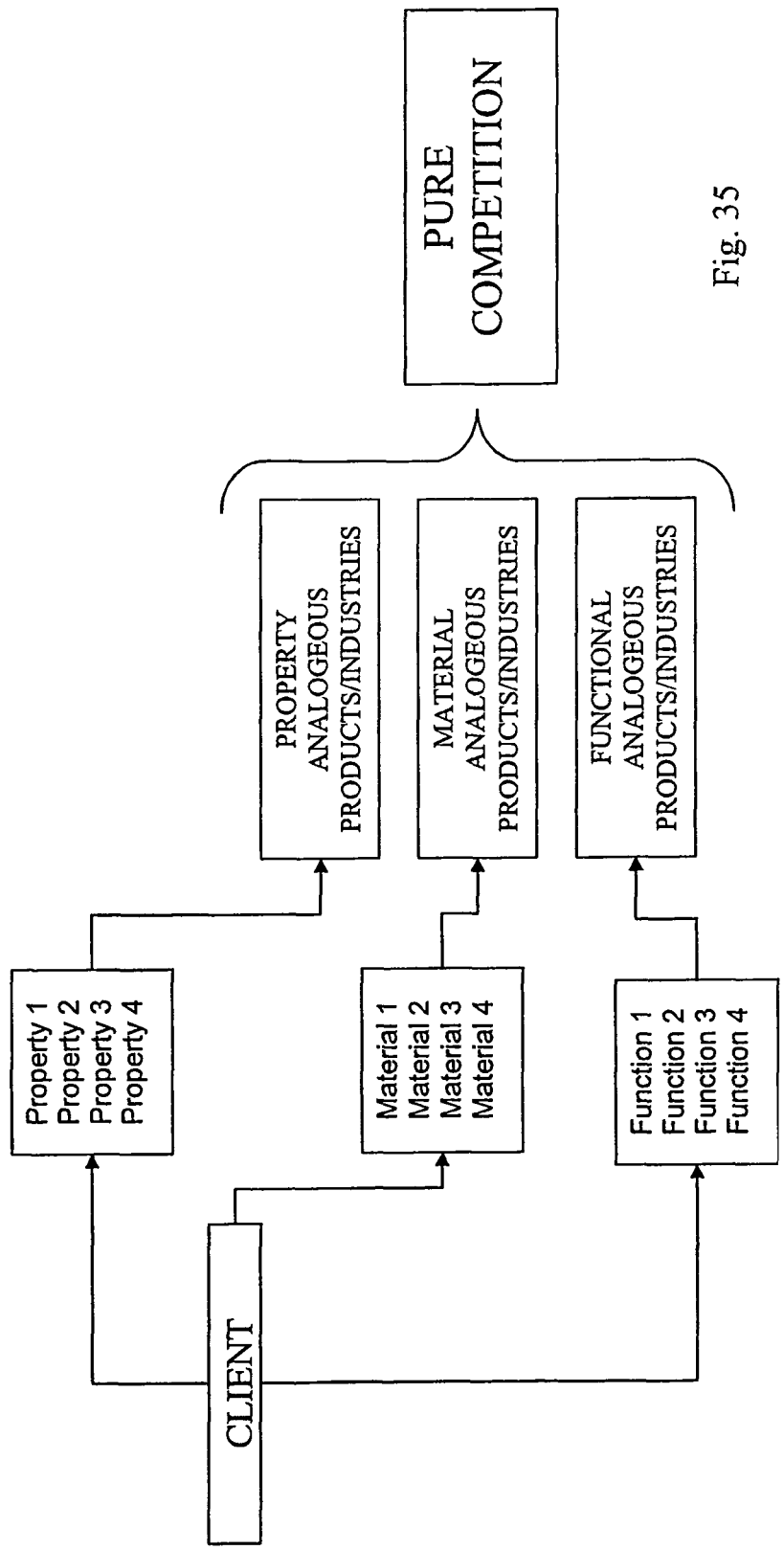

FIGS. 31 to 35 relate to another embodiment of the present invention in which, instead of tuples of function/property, three features are used: property, function and material. These three features can be obtained from language analysis of data repositories as described above. Adding a third generic product feature allows a similar analysis to that already presented above but in an enhanced way. In FIGS. 3A and B only one feature, e.g. property or function was used as an entry to a product variation algorithm. In FIG. 32, combinations of a material and a property are used to extract from data depositories links between the specific combination and functions. This allows new functions to be found for combinations of a material and a property. FIG. 33 relates to a further embodiment in combinations of a function and a material are used to interrogate data repositories to find links to new properties. FIG. 34 relates to a further embodiment in which combinations of functions and properties are used to interrogate data repositories to find links to new materials. FIG. 35 relates to using combinations of functions, properties and materials to find products with the same set—that is to find products that compete directly. Such a new product could be considered as a direct replacement for the existing one.

Figure 36:
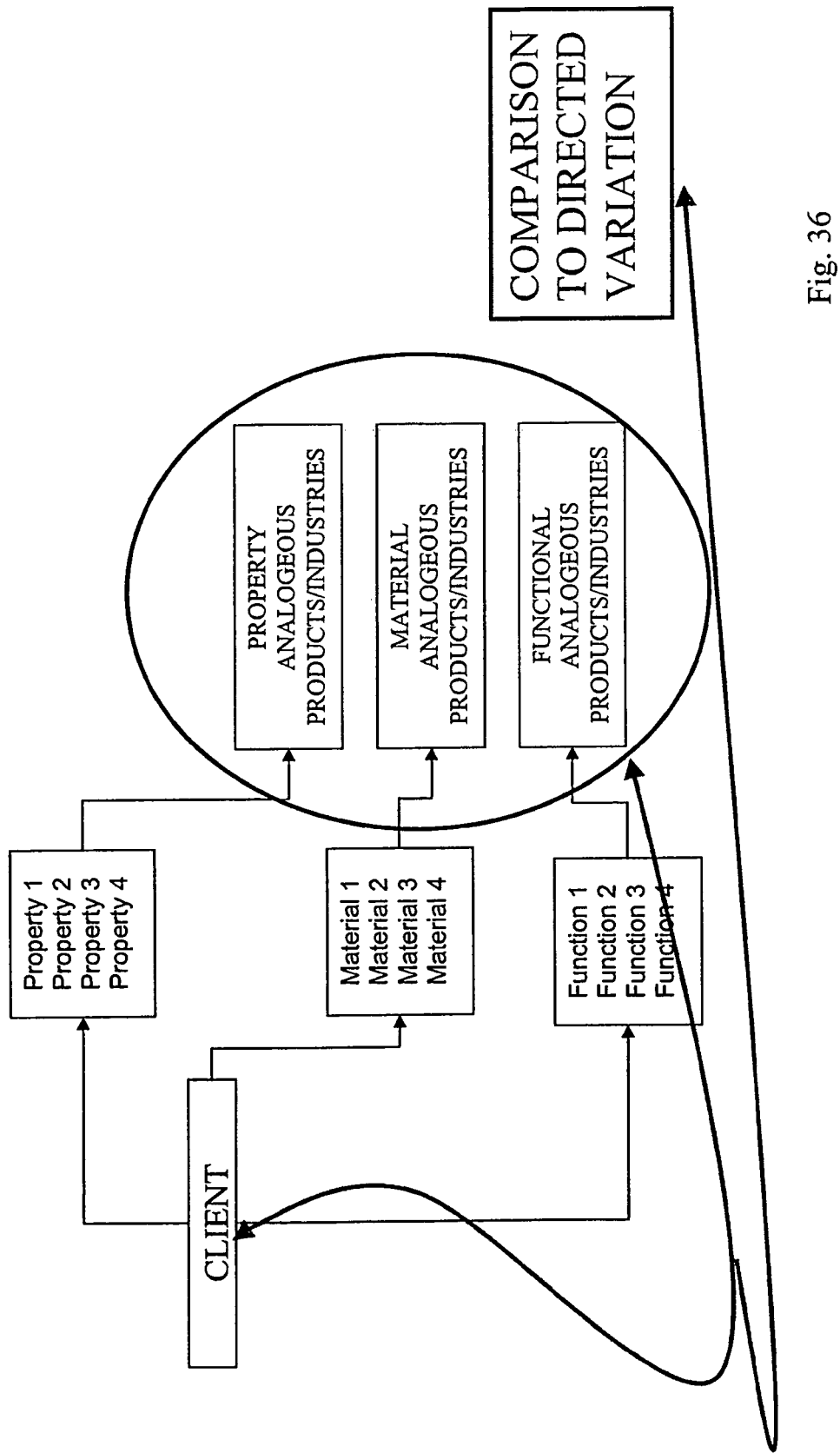

As indicated in FIG. 36 the present invention includes extending the property/function product variation methods described above to more than two features of a product. All the methods described above can be extended to more features. For example instead of property spectra, the present invention includes spectra based on any combination of features such as property/material or function material, etc. Hence indexed databases can be generated for any of the combinations mentioned above and shown in FIGS. 31 to 35.

The present invention also includes systems and software for carrying out any of the embodiments of the present invention. For example the interrogation of the data repositories to obtain the indexed database can be carried out in a computer based system comprising a means for data storage such as a RAID storage system controlled by a server. The means for data storage stores the data repository having text documents that is to be interrogated in accordance with embodiments of the present invention. The means for data storage, e.g. RAID devices and the server can be connected via a network such as a shared resources network of which a local area network, a metropolitan area network, a wide area network, the Internet are examples. One or more workstations may be adapted to interrogate the means for data storage by a suitable network, e.g. a shared resources network of which a local area network, a metropolitan area network, a wide area network, the Internet are examples. The workstations will have means for inputting queries and additional data, such as a keyboard, a mouse pointer, local storage means such as hard disks, optical disks, etc. as well as a display to display the results. Optionally, a load speaker may be provided to deliver the results of the algorithms mentioned above as to product design variation verbally. The workstations will be adapted, e.g. by means of suitable software to carry out any suitable form of analysis on the means for data storage and the text documents store therein, e.g. semantic analysis, grammatical analysis, POS tagging or probing with keywords or a combination of any of these.

The workstations are preferably adapted, e.g. by means of suitable software to carry out language analysis of the data repository, e.g. database or databases, to generate a distinct number of first parts of speech such as adjectives, or adjectival phrases or adjectival statements (being definitions of properties to be varied called function statements) linked to a distinct number of second parts of speech such as verbs, or verb-like phrases or statements (being definitions of functions of the product called function statements). The workstations, are preferably adapted, e.g. by means of suitable software to store a list of property statements, optionally with the related first parts of speech, linked to the respective function statements optionally with the related second parts of speech in a new database of indexed property statements/function statement tuples. The workstations are preferably adapted, e.g. by means of suitable software, to use alternative or additional features to form the indexed database such as materials or production methods which are associated with the property statements or function statements, e.g. manufacturing methods suitable to obtain a specific property. The workstations are preferably adapted, e.g. by means of suitable software to carry out language analysis of machine readable data repositories, e.g. databases, to find at least tuples such as property/function tuples linking properties of products and functions of products independently of the products themselves. "At least tuples" means that more features can be analysed than two. For example, more tuples may be analysed or more than two features may be linked together. These tuples or more than tuples are found by searching for linkages between relevant textural or semantic or grammatical features such as adjectives and verbs in the machine readable data repositories, e.g. database(s) or by using dictionaries or thesauri of adjectives to do key word searching to achieve the same result.

The workstations are preferably adapted, e.g. by means of suitable software, such that after analysis of the text based data repositories, e.g. databases, the features or tuples or the more than tuples are ranked in any of a variety of ways, e.g. based on frequency of occurrence in the documents of the data repository, or based on technology, e.g. the data repository may be restricted to medical applications only etc. The workstations may be adapted, e.g. by means of suitable software to filter the data repository to select a subset of relevant documents, e.g. medical, followed by the searching for the features or at least tuples, e.g. property/function tuples. Alternatively a complete data repository may be searched without a pre-filtering step.

The workstations are preferably adapted, e.g. by means of suitable software to use the indexed database provide product design changes or "product variations". Product can be any suitable product such as an apparatus, a device, a service, a process, a living organism such as a microorganism or a plant, etc. The workstations are preferably adapted, e.g. by means of suitable software to make use of a limited number of third parts of speech such as nouns or noun-like phrases or statements (being definitions of products called product statements) that are varied by linking the product to a distinct number of first parts of speech such as adjectives, or adjectival phrases or adjectival statements (being definitions of properties to be varied) giving third parts of speech, e.g. new verbs, or verb-like phrases or statements (being definitions of functions of the product).

The workstations are preferably adapted, e.g. by means of suitable software to provide a computer based property variation tool The workstations are preferably adapted, e.g. by means of suitable software to generate new functions for a product automatically. The workstations are preferably adapted, e.g. by means of suitable software to provide a conflict resolution tool (e.g. problem solving) which can be stand-alone or integrated with the property variation tool. The workstations are preferably adapted, e.g. by means of suitable software to provide changes required to the properties of a product to solve conflicts, or to find new products solving old conflicts. The workstations are preferably adapted, e.g. by means of suitable software so that when two properties are conflicting, one or more variations of (other) properties can be generated automatically to make them coexist or allow a more efficient coexistence.

The workstations are preferably adapted, e.g. by means of suitable software, to generate spectra, e.g. property spectra automatically by interrogating the data repositories, e.g. by Supervised Machine Learning, by Latent Semantic Indexing, by using taxonomies (e.g. lists of topical words) and/or by thesauri (e.g. synonyms, antonyms).

The workstations are preferably adapted, e.g. by means of suitable software, to compare products, and extrapolate relevant analogies to any specific domain challenge. The workstations are preferably adapted, e.g. by means of suitable software, so that for each product (noun) a series of descriptors may be formed to characterize that product. Such descriptors may include any of: properties listed as a string, functions listed as a string, lists of tuples of functions and the related properties as a string or any other list. The workstations are preferably adapted, e.g. by means of suitable software, to generate descriptors of a product derived by analyzing the text based data repositories.

The workstations are preferably adapted, e.g. by means of suitable software, to use the product descriptor to identify other products which have a relevant similarity or analogy with the product under investigation. The workstations are preferably adapted, e.g. by means of suitable software, to compare the descriptor with descriptors of products obtained by language analysis of data repositories, such as databases with text documents and ranking the comparisons in accordance with a degree of similarity. The workstations are preferably adapted, e.g. by means of suitable software, to analyze products with a high or higher degree of similarity for product variations e.g. product variations that have occurred over time. The workstations are preferably adapted, e.g. by means of suitable software that carries out the similarity processing allowing for the variations in language and words used. The workstations are preferably adapted, e.g. by means of suitable software to automatically augment the simple descriptors mentioned above with known synonyms. To do this the software may be adapted interrogate thesauri or dictionaries, e.g. either local or on a network such as the internet. The software may allow for different spellings, e.g. American and British spellings, may use dedicated dictionaries that provide the most useful alternative forms of words for use as alternative descriptors, and may use words in a stylized form, e.g. reduced to their base form through stemming.

The workstations mentioned above may be any suitable computer such as a personal computer or a laptop with the appropriate software installed. The software may be any suitable type. For example, such a workstation will typically have a microprocessor and a memory and the software will typically be written and compiled for that microprocessor. Alternatively the software may be written in an interpreted language and may compiled for a virtual machine running on the workstation, e.g. written in the language Java and complied for the Java Virtual machine.

The present invention also includes computer products such as software programs that carry out any of the methods detailed above when executed on a suitable computing system.

The present invention also includes any such software stored on a suitable signal medium such as storage disks, like diskettes, hard drives, optical disks such as CR-ROMs or DVD-ROMs, or stored in any memory or stored on solid state devices such as USB memory sticks.

I claim:

1. A computer based method to identify features of a product in an automatic manner, comprising:
language analysis of a machine readable data repository of documents to generate at least a first list of property statements comprising a distinct number of first parts of speech being definitions of properties to be varied, and at least a second list of function statements comprising a distinct number of second parts of speech being definitions of functions of the product, the first and second lists being generated automatically in a product technology independent way;
linking the first list of property statements to respective function statements in the second list whereby a property statement is linked to a function statement if a variation in such property brings about the linked function; and
storing the linked first and second list as at least indexed property statements/function statement tuples.

2. The computer based method according to claim 1, the first parts of speech being adjectives, or adjectival phrases or adjectival statements.

3. The computer based method according to claim 1, the second parts of speech being verbs, or verb-like phrases or statements.

4. The computer based method according to claim 1, wherein the language analysis is selected from semantic analysis, grammatical analysis, POS tagging, statistical Natural Language Processing, or probing with keywords or a combination of any of these.

5. The computer based method of claim 1 further comprising forming the indexed database with additional linked features generated by language analysis of the machine readable data repository, the additional features being selected from materials which are associated with the property statements or function statements, production methods which are associated with the property statements or function statements, manufacturing methods suitable to obtain a specific property.

6. The computer based method of claim 1 the indexed property statements/function statement tuples are ranked.

7. The computer based method of claim 6, wherein the ranking is selected from frequency of occurrence in the documents of the data repository, or by technology.

8. The computer based method of claim 1, comprising first filtering the data repository to select a subset of relevant documents before searching for the at least property statement/function statement tuples.

9. The computer based method of claim 1 wherein forming the linked first and second list into a new database of at least indexed property statements/function statement tuples includes generating a table linking the first list of property statements to respective function statements in the second list.

10. The computer based method of claim 9, wherein the table links property, function, production method and materials together.

11. The computer based method of claim 1, adapted to provide product design changes automatically.

12. The computer based method of claim 11, wherein the product design changes are derived from the indexed database.

13. The computer based method of claim 11, wherein a limited number of third parts of speech being definitions of a product called product statements are varied by linking the product statements to a distinct number of the first parts of speech being definitions of properties to be varied giving second parts of speech being definitions of functions of the product.

14. The computer based method of claim 13, wherein the third parts of speech are nouns or noun-like phrases or statements.

15. The computer based method of claim 13 wherein for each product statement a series of descriptors are formed to characterize that product.

16. The computer based method of claim 13 wherein the descriptors are selected from: properties listed as a string, functions listed as a string, lists of tuples of functions and the related properties as a string or any other list including descriptors of the product that can be derived by analysing text based databases such a manufacturing method or materials used.

17. The computer based method of claim 16 wherein the product descriptor is used to identify other products having a similarity or analogy with the product under investigation.

18. The computer based method of claim 17, wherein identifying other products having a similarity or analogy is done by comparing the product descriptor with other descriptors of products obtained by language analysis of data repositories and ranking the comparisons in accordance with a degree of similarity.

19. The computer based method of claim 18, comprising identifying other products known in the past having a similarity or analogy and determining the evolution with time of the other products.

20. The computer based method of claim 11, wherein providing product design changes automatically comprises selecting a property statement of a product, exploring different property statements linked by function statement/property statement tuples to thereby determine new product function or functions and automatically outputting specifications for new products.

21. The computer based method of claim 11, wherein providing product design changes automatically comprises selecting a function statement, exploring property variations linked by function statement/property statement tuples that enable this function, and outputting specifications for new products automatically.

22. The computer based method of claim 1, wherein a product can be selected from an apparatus, a device, a service, a process, a living organism.

23. The computer based method of claim 1 further comprising identifying a list of products, new applications or technologies which have or need similar properties and functions.

24. A computer based method to identify features of a product in an automatic manner, comprising:
obtaining a database of linked first and second lists according to the method of claim 1 comprising at least indexed property statements/function statement tuples and generating product design changes automatically.

25. A computer based system for identifying features of a product in an automatic manner, comprising:
a language analyser of a machine readable data repository of documents for generating at least a first list of property statements comprising a distinct number of first parts of speech being definitions of properties to be varied, and at least a second list of function statements comprising a distinct number of second parts of speech being definitions of functions of the product, the first and second lists being generated automatically in a product technology independent way;

a linking means for linking the first list of property statements to respective function statements in the second list, the linking means being adapted such that a property statement is linked to a function statement if a variation in such property brings about the linked functions, and
means for storing the linked first and second list as at least indexed property statements/function statement tuples.

* * * * *